United States Patent
Lu et al.

(10) Patent No.: US 10,935,804 B1
(45) Date of Patent: *Mar. 2, 2021

(54) OPTICAL STRUCTURE COMPRISING A PLURALITY OF STACKED OPTICAL ELEMENTS THAT RECEIVE LIGHT HAVING A FIRST POLARIZATION AND OUTPUT LIGHT HAVING A SECOND POLARIZATION TO A FOCAL POINT

(71) Applicant: Facebook Technologies, LLC, Menlo Park, CA (US)

(72) Inventors: Lu Lu, Kirkland, WA (US); Scott Charles McEldowney, Redmond, WA (US); Nada O'Brien, Quilcene, WA (US); Pasi Saarikko, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,071

(22) Filed: May 12, 2020

Related U.S. Application Data

(63) Continuation of application No. 16/394,819, filed on Apr. 25, 2019, now Pat. No. 10,690,930, which is a
(Continued)

(51) Int. Cl.
*G02B 27/28* (2006.01)
*G02F 1/1335* (2006.01)
(Continued)

(52) U.S. Cl.
CPC ............ *G02B 27/286* (2013.01); *G02B 5/30* (2013.01); *G02B 27/017* (2013.01); *G02B 27/28* (2013.01);
(Continued)

(58) Field of Classification Search
CPC .... G02F 1/292; G02F 2201/307; G02F 1/137; G02F 1/13342; G02F 2201/305;
(Continued)

(56) References Cited

U.S. PATENT DOCUMENTS 6,115,152 A 9/2000 Popovich et al.
9,429,756 B1 8/2016 Cakmakci et al.
(Continued)

FOREIGN PATENT DOCUMENTS

CN 105911697 A 8/2016
CN 106654592 A 5/2017
(Continued)

OTHER PUBLICATIONS

United States Office Action, U.S. Appl. No. 16/451,492, dated Sep. 3, 2020, 10 pages.
(Continued)

*Primary Examiner* — Paul C Lee
(74) *Attorney, Agent, or Firm* — Fenwick & West LLP

(57) ABSTRACT

A Pancharatnam Berry Phase (PBP) color corrected structure is presented that comprises a plurality of switchable gratings and a plurality of PBP active elements. Each switchable grating has an inactive mode when reflects light of a specific color channel, of a set of color channels, and transmits light of other color channels in the set of color channels, wherein the specific color channel is different for each of the plurality of switchable gratings, and to have an active mode to transmit light that is inclusive of the set of color channels. The PBP active elements receive light output from at least one of the plurality of switchable gratings. Each of the PBP active elements is configured to adjust light of a different color channel of the set of color channels by a same amount to output light corrected for chromatic aberration for the set of color channels.

20 Claims, 10 Drawing Sheets

Related U.S. Application Data continuation of application No. 16/177,139, filed on Oct. 31, 2018, now Pat. No. 10,317,772, which is a continuation of application No. 15/393,984, filed on Dec. 29, 2016, now Pat. No. 10,151,961.

(51) Int. Cl.
*G02B 27/01* (2006.01)
*G02B 5/30* (2006.01)
*G02B 30/25* (2020.01)
*G02F 1/29* (2006.01)

(52) U.S. Cl.
CPC ....... *G02B 30/25* (2020.01); *G02F 1/133528* (2013.01); *G02F 1/292* (2013.01); *G02B 5/3025* (2013.01); *G02F 2001/133541* (2013.01); *G02F 2201/307* (2013.01); *G02F 2203/24* (2013.01); *G02F 2203/28* (2013.01)

(58) Field of Classification Search
CPC ........... G02F 2201/30; G02F 2203/055; G02F 2203/05; G02F 2203/62; G02F 2001/133541; G02F 2203/24; G02F 2203/28; G02B 2006/12107
See application file for complete search history.

(56) References Cited

U.S. PATENT DOCUMENTS

| | | | |
|---|---|---|---|
| 10,151,961 B2 | 12/2018 | Lu et al. | |
| 10,690,930 B1* | 6/2020 | Lu | G02F 1/137 |
| 2002/0030776 A1* | 3/2002 | Khan | G02F 1/13718 349/114 |
| 2002/0176148 A1 | 11/2002 | Onuki et al. | |
| 2005/0047705 A1* | 3/2005 | Domash | G02F 1/011 385/10 |
| 2005/0151896 A1* | 7/2005 | Hara | G02B 5/3083 349/96 |
| 2005/0254752 A1* | 11/2005 | Domash | G02F 1/313 385/37 |
| 2008/0018833 A1* | 1/2008 | Ma | G02F 1/13718 349/98 |
| 2009/0316097 A1 | 12/2009 | Presniakov et al. | |
| 2010/0231783 A1 | 9/2010 | Bueler et al. | |
| 2012/0019523 A1 | 1/2012 | Lee et al. | |
| 2012/0154924 A1 | 6/2012 | Lee et al. | |
| 2013/0107177 A1* | 5/2013 | Kang | H04N 13/305 349/102 |
| 2013/0176203 A1 | 7/2013 | Yun et al. | |
| 2013/0307948 A1 | 11/2013 | Odake et al. | |
| 2014/0022619 A1 | 1/2014 | Woodgate et al. | |
| 2014/0192296 A1 | 7/2014 | Hsiao et al. | |
| 2014/0204455 A1 | 7/2014 | Popovich et al. | |
| 2014/0285878 A1* | 9/2014 | Escuti | G02F 1/13363 359/352 |
| 2014/0300711 A1 | 10/2014 | Kroon et al. | |
| 2014/0361990 A1* | 12/2014 | Leister | G03H 1/2286 345/156 |
| 2015/0010265 A1* | 1/2015 | Popovich | G06K 9/0004 385/10 |
| 2015/0323803 A1 | 11/2015 | Tung et al. | |
| 2016/0011353 A1* | 1/2016 | Escuti | G02B 5/3083 359/15 |
| 2016/0103253 A1 | 4/2016 | Oku et al. | |
| 2016/0327793 A1 | 11/2016 | Chen et al. | |
| 2016/0349506 A1 | 12/2016 | Meneghini et al. | |
| 2017/0293145 A1 | 10/2017 | Miller et al. | |
| 2018/0132698 A1 | 5/2018 | Galstian et al. | |

FOREIGN PATENT DOCUMENTS

| | | |
|---|---|---|
| WO | WO 2004/003596 A2 | 1/2004 |
| WO | WO 2008/026206 A2 | 3/2008 |
| WO | WO 2014/181419 A1 | 11/2014 |

OTHER PUBLICATIONS

Crawford, G.P., "Electrically Switchable Bragg Gratings," Optics & Photonics News, Apr. 2003, pp. 54-59, vol. 14, No. 4.

Hoffman, D.M. et al., "Vergence—Accommodation Conflicts Hinder Visual Performance and Cause Visual Fatigue," Journal of Vision, Mar. 2008, pp. 1-30, vol. 8, No. 33.

Shibata, T. et al., "The Zone of Comfort: Predicting Visual Discomfort with Stereo Displays," Journal of Vision, Jul. 2011, pp. 1-29, vol. 11(8), No. 11.

Banks, M.S. et al., "Consequences of Incorrect Focus Cues in Stereo Displays," SIDS Information Display Online, Jul. 2008, 7 pages, [Online] [Retrieved on Jun. 26, 2017] Retrieved from the Internet<URL: http://informationdisplay.org/IDArchive/2008/July/ConsequencesofIncorrectFocusCuesinStereoDis.aspx>.

Nowinowski-Kruszelnicki, E. et al., "High Birefringence Liquid Crystal Mixtures for Electro-Optical Devices," Optica Applicata XLII, No. 1, 2012, pp. 167-180.

* cited by examiner

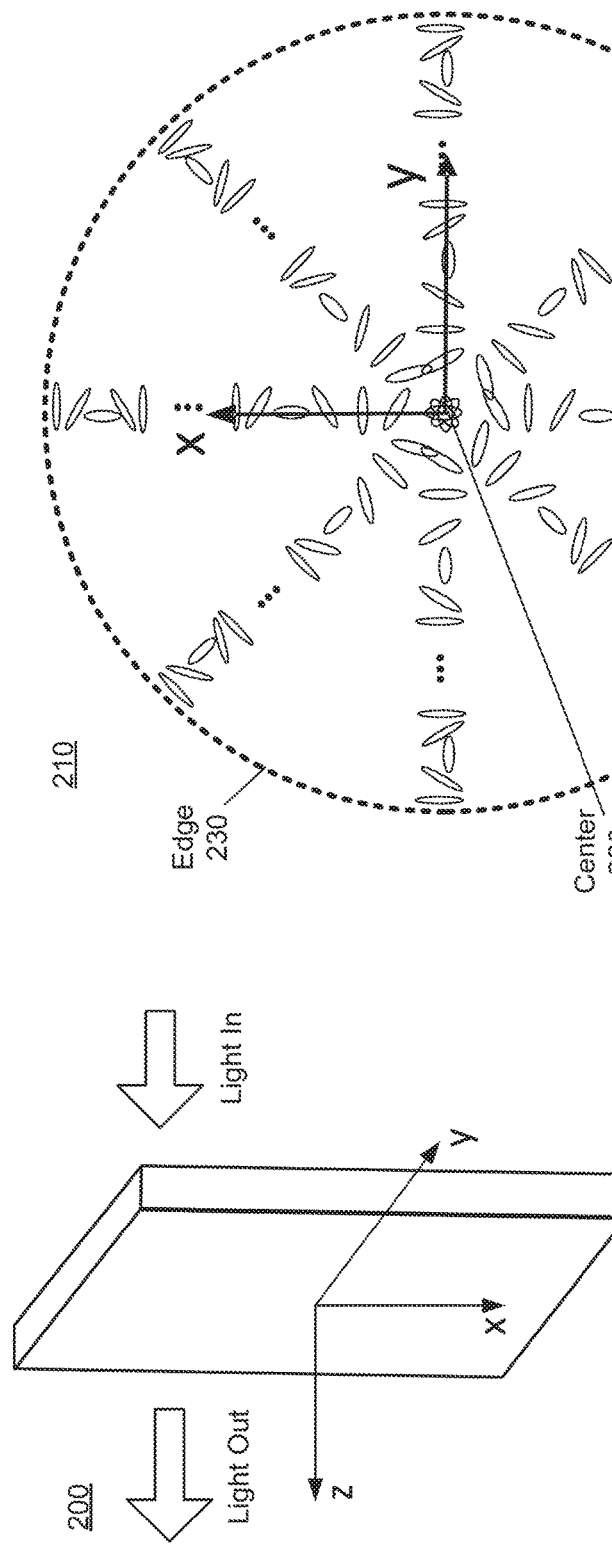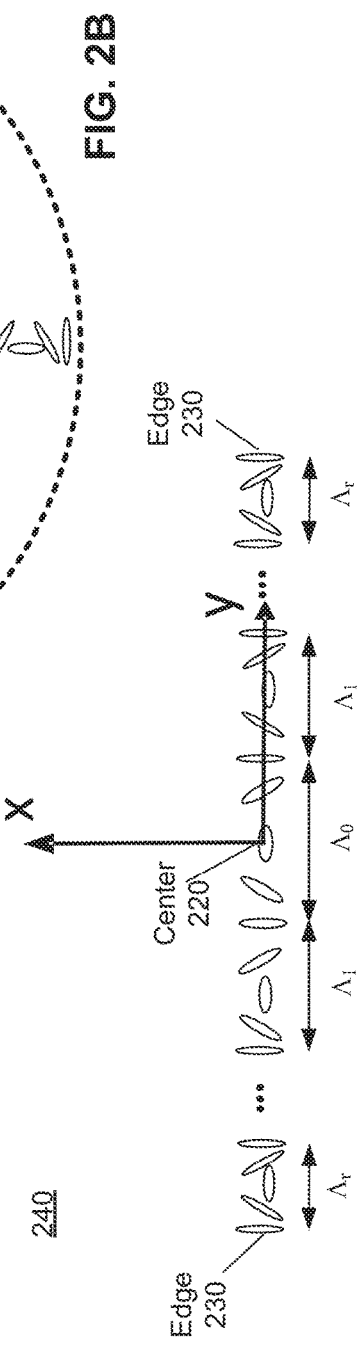
FIG. 2A
FIG. 2B
FIG. 2C

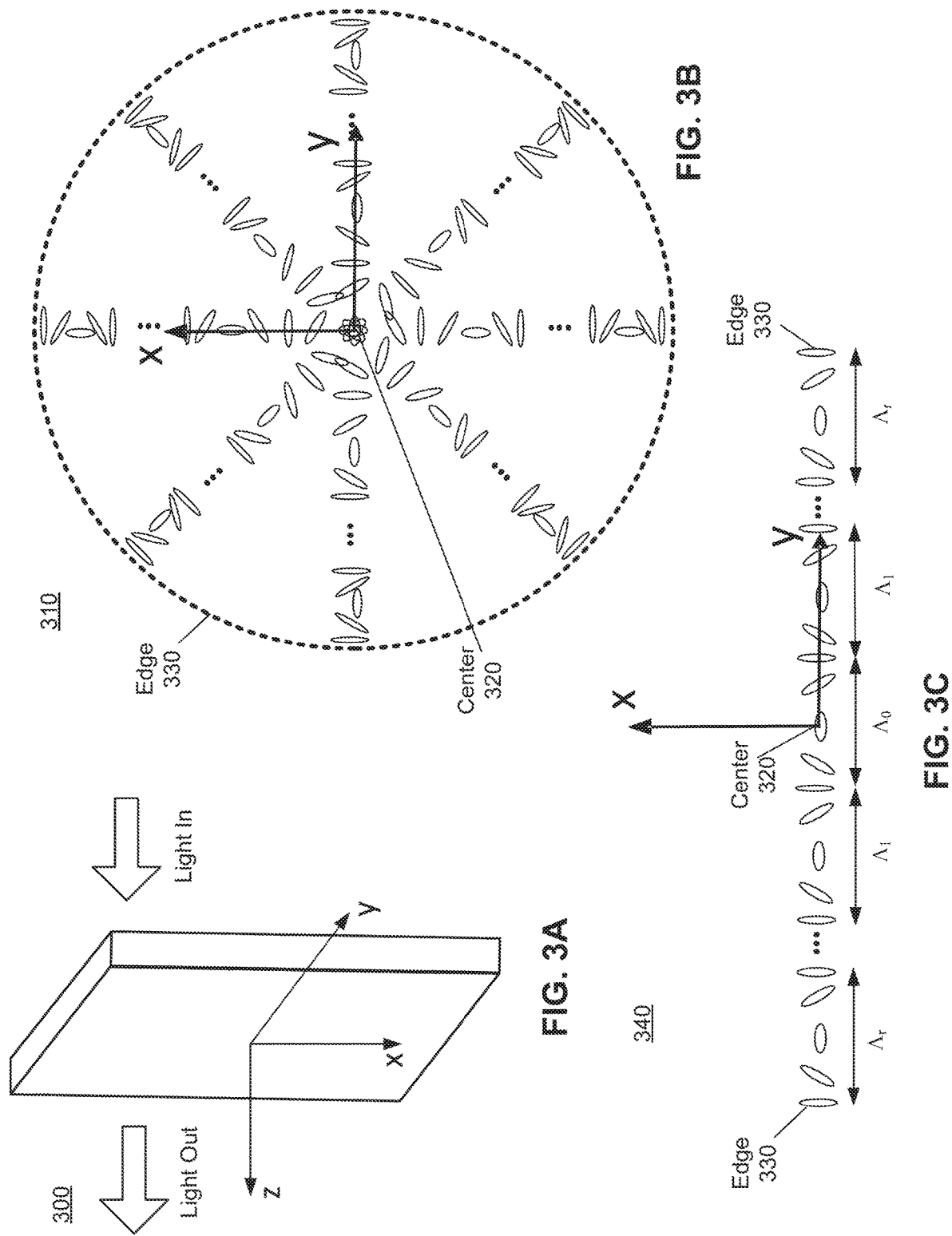

OPTICAL STRUCTURE COMPRISING A PLURALITY OF STACKED OPTICAL ELEMENTS THAT RECEIVE LIGHT HAVING A FIRST POLARIZATION AND OUTPUT LIGHT HAVING A SECOND POLARIZATION TO A FOCAL POINT

CROSS REFERENCE TO RELATED APPLICATIONS

This application is a continuation of co-pending U.S. application Ser. No. 16/394,819, filed Apr. 25, 2019, which is a continuation of U.S. application Ser. No. 16/177,139, filed Oct. 31, 2018, now U.S. Pat. No. 10,317,772, which is a continuation of U.S. application Ser. No. 15/393,984, filed Dec. 29, 2016, now U.S. Pat. No. 10,151,961, each of which is incorporated by reference in its entirety.

BACKGROUND

The present disclosure generally relates to design of optical assembly, and specifically relates to chromatic error correction of Pancharatnam Berry Phase (PBP) liquid crystal components for optical assemblies that may be used in virtual reality (VR), augmented reality (AR) and mixed reality (MR) systems.

PBP liquid crystal components can be used as an integral part of an optical assembly in a head-mounted display (HMD) that may be part of, e.g., a VR system, an AR system, a MR system, or some combination thereof. The PBP liquid crystal components can be implemented as PBP liquid crystal gratings and PBP liquid crystal lenses. However, both types of PBP liquid crystal components have strong wavelength dependences on optical performance. For example, a PBP liquid crystal grating has strong wavelength dependence on a beam steering angle, i.e., the PBP liquid crystal grating diffracts light by an angle that depends on a wavelength of the light coming into the PBP liquid crystal grating. In an illustrative embodiment, the PBP liquid crystal grating can steer beam of light at 10 degrees for green light or green color channel (i.e., wavelength of 525 nm); a beam steering angle for red light or red color channel is larger (e.g., 12.03 degrees for wavelength of 630 nm); and a beam steering angle is smaller for blue light or blue color channel (e.g., 9.33 degrees for wavelength of 490 nm). Similarly, a PBP liquid crystal lens has strong wavelength dependence on a lens focus, i.e., the PBP liquid crystal lens focuses light to a focus that depends on a wavelength of the light coming into PBP liquid crystal lens. In an illustrative embodiment, the PBP liquid crystal lens can provide focus at 2 Diopter (500 mm) for green color channel; the focus for red color channel is shorter (e.g., 416.67 mm); and the focus for blue color channel is longer (e.g., 535.71 mm).

Thus, a steering angle of a PBP liquid crystal grating and a focus of a PBP liquid crystal lens are strongly chromatic, i.e., light that is output from an optical assembly that includes one or more PBP liquid crystal components features chromatic aberration. This reduces image quality in any imaging system that employs an optical assembly with PBP liquid crystal components and a light source that emits light of multiple wavelengths or color channels.

SUMMARY

Embodiments of the present disclosure support a Pancharatnam Berry Phase (PBP) color corrected structure. The PBP color corrected structure comprises a plurality of switchable gratings and a plurality of PBP active elements. Each switchable grating is configured to have an inactive mode to reflect light of a specific color channel, of a set of color channels, and transmit light of other color channels in the set of color channels, wherein the specific color channel is different for each of the plurality of switchable gratings. Each switchable grating is also configured to have an active mode to transmit light that is inclusive of the set of color channels. The plurality of PBP active elements receive light output from at least one of the plurality of switchable gratings. Each PBP active element is configured to adjust light of a different color channel of the set of color channels by a same amount to output light corrected for chromatic aberration for the set of color channels.

Embodiments of the present disclosure further support a head-mounted display (HMD) comprising an electronic display, an optical assembly and a controller. The electronic display is configured to emit image light that is inclusive of a set of color channels. The optical assembly is configured to optically correct for chromatic aberration for the set of color channels using a PBP color corrected structure that outputs image light corrected for chromatic aberration for the set of color channels in accordance with color correction instructions. The PBP color corrected structure comprises a plurality of switchable gratings and a plurality of PBP active elements. Each switchable grating is configured to have an inactive mode to reflect image light of a specific color channel, of the set of color channels, and transmit image light of other color channels in the set of color channels, wherein the specific color channel is different for each of the plurality of switchable gratings. Each switchable grating is also configured to have an active mode to transmit light that is inclusive of the set of color channels. The plurality of PBP active elements receive a portion of the image light output from at least one of the plurality of switchable gratings. Each PBP active element is configured to adjust light of a different color channel of the set of color channels by a same amount to generate optically corrected image light for chromatic aberration for the set of color channels. The optical assembly directs the optically corrected image light to an eye-box region of the HMD corresponding to a location of an eye of a user of the HMD. The controller is coupled to the PBP color corrected structure and configured to generate the color correction instructions and provide the color correction instructions to the PBP color corrected structure.

BRIEF DESCRIPTION OF THE DRAWINGS

FIG. 2A is an example PBP liquid crystal lens, according to an embodiment.

FIG. 2B is an example of liquid crystal orientations in the PBP liquid crystal lens of FIG. 2A, according to an embodiment.

FIG. 2C is a portion of liquid crystal orientations in the PBP liquid crystal lens of FIG. 2A, according to an embodiment.

FIG. 3A is an example PBP liquid crystal grating, according to an embodiment.

FIG. 3B is an example of liquid crystal orientations in the PBP liquid crystal grating of FIG. 3A, according to an embodiment.

FIG. 3C is a portion of liquid crystal orientations in the PBP liquid crystal grating of FIG. 3A, according to an embodiment.

Figure 1A:
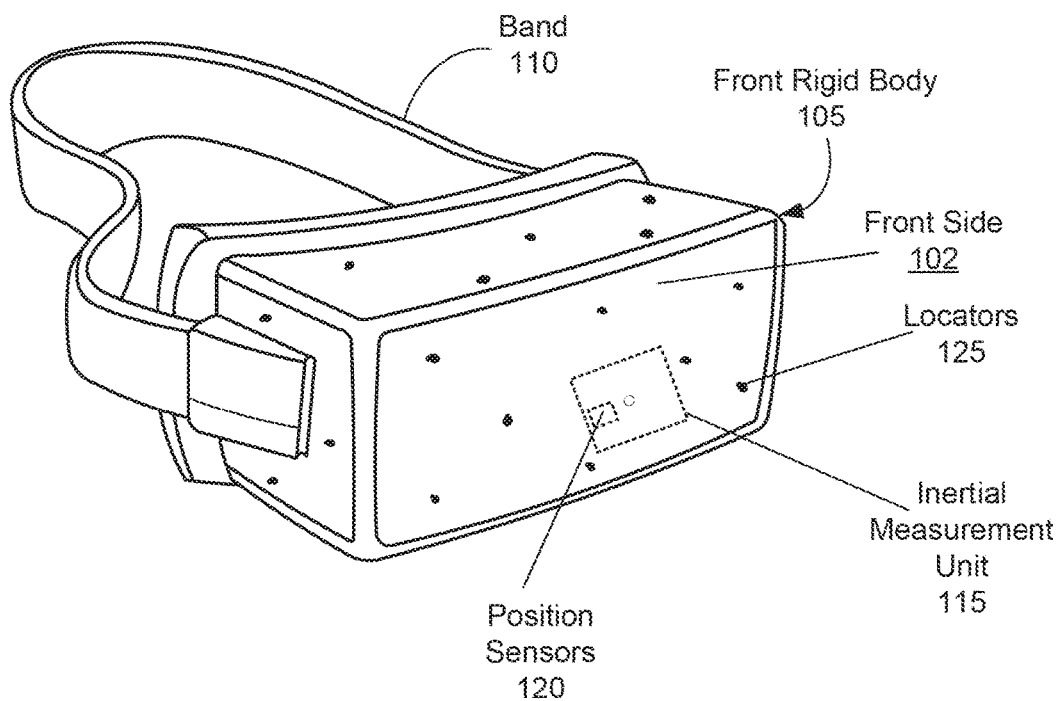
FIG. 1A is a wire diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Electrically switchable gratings such as electrically switchable Bragg gratings are used in conjunction with PBP components to form a PBP color corrected grating structure or a PBP color corrected lens structure. Each electrically switchable Bragg grating has an active and an inactive state. When active an electrically switchable Bragg grating passes all light without diffraction, however, when non-active the electrically switchable Bragg grating reflects a particular color channel (e.g., red, blue, or green) and transmits the remaining color channels. In some embodiments, a color channel is a particular wavelength (e.g., 510 nm may correspond to a green color channel) of light or range of wavelengths of light. The grating structure includes a series of PBP liquid crystal gratings that are each associated with a different color channel, such that each of the PBP liquid crystal gratings diffracts light (of their color channel) to a common angle. The grating structure also includes electrically switchable Bragg gratings that each corresponds to a respective PBP liquid crystal grating (e.g., a PBP liquid crystal grating designed to diffract red color channel has a corresponding electrically switchable Bragg grating that is configured to reflect red color channel when inactive). The electrically switchable Bragg gratings for each color channel are placed prior to their corresponding PBP liquid crystal diffraction gratings. The lens structure includes a series of electrically switchable Bragg gratings that are each associated with a different color channel, and a series of PBP liquid crystal lenses. In the lens structure, each PBP liquid crystal lens is configured to focus light of a different color channel, and each PBP liquid crystal lens for a particular color channel has a corresponding SBG that is associated with the same color channel. In the lens structure, electrically switchable Bragg gratings for each color channel are placed prior to their corresponding PBP liquid crystal lenses. In both the grating structure and the lens structure, the electrically switchable Bragg gratings may be controlled in a time sequential manner such that light of a particular color channel (e.g., red, blue, or green) is transmitted and light of the remaining color channels is reflected during a particular time frame (e.g., green, then blue, then red). Accordingly, for the diffraction structure, light for each color channel is diffracted to a common angle in a time sequential manner and, similarly, in the lens structure, light for each color channel is focused to a common focal point in a time sequential manner.

The PBP color corrected structures presented herein may be used in, e.g., an optical assembly of a head-mounted display (HMD). The HMD may be part of, e.g., a virtual reality (VR) system, an augmented reality (AR) system, a mixed reality (MR) system, or some combination thereof.

FIG. 1A is a wire diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105 and a band 110. The front rigid body 105 includes one or more electronic display elements of an electronic display (not shown), an Inertial Measurement Unit (IMU) 115, one or more position sensors 120, and locators 125. In the embodiment shown by FIG. 1A, the position sensors 120 are located within the IMU 115, and neither the IMU 115 nor the position sensors 120 are visible to a user wearing the HMD 100. The IMU 115, the position sensors 120, and the locators 125 are discussed in detail below with regard to FIG. 10.

Figure 1B:
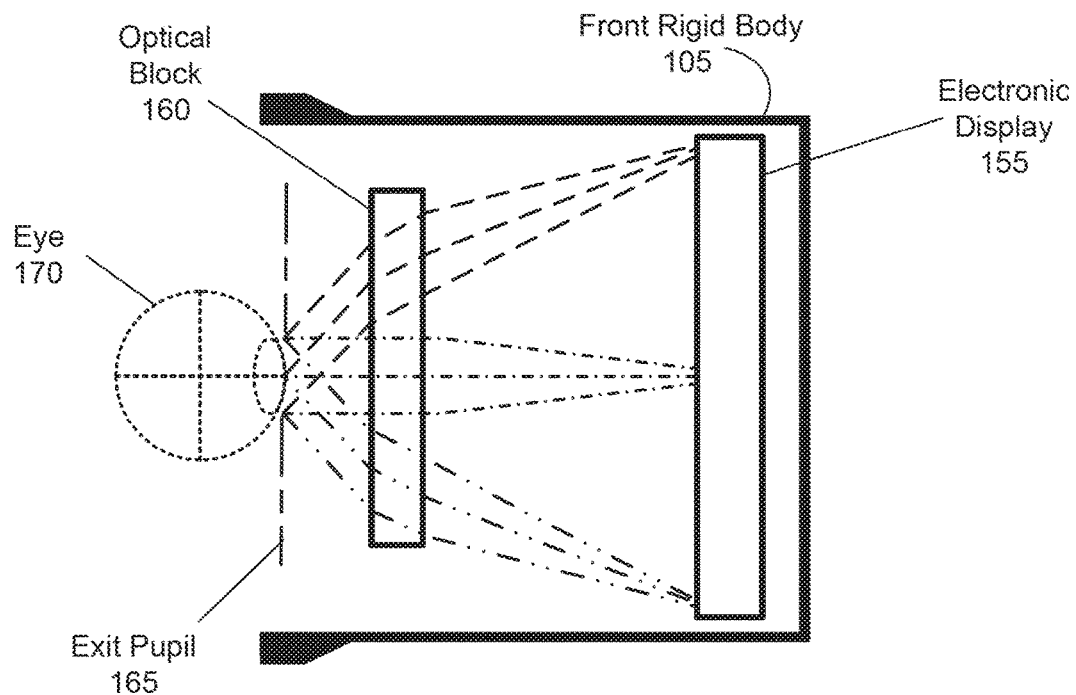
FIG. 1B is a cross section of a front rigid body of the HMD in FIG. 1A, in accordance with an embodiment.

FIG. 1B is a cross section 150 of the front rigid body 105 of the embodiment of the HMD 100 shown in FIG. 1A. As shown in FIG. 1B, the front rigid body 105 includes an electronic display 155 and an optical block 160 that together provide image light to an exit pupil 165. The exit pupil 165 is the location of the front rigid body 105 where a user's eye 170 is positioned. For purposes of illustration, FIG. 1B shows a cross section 150 associated with a single eye 170, but another optical block 160, separate from the optical block 160, provides altered image light to another eye of the user. Additionally, the HMD 100 includes an eye tracking system (not shown). The eye tracking system may include, e.g., one or more sources that illuminate one or both eyes of the user, and one or more cameras that captures images of one or both eyes of the user.

The electronic display 155 displays images to the user. In various embodiments, the electronic display 155 may comprise a single electronic display or multiple electronic displays (e.g., a display for each eye of a user). Examples of the electronic display 155 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof.

The optical block 160 magnifies received light from the electronic display 155, corrects optical aberrations associated with the image light, and the corrected image light is presented to a user of the MID 100. Magnification of the image light by the optical block 160 allows elements of the electronic display 155 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optical block 160 is designed so its effective focal length is larger than the spacing to the electronic display 155, which magnifies the image light projected by the electronic display 155. The optical block 160 includes one or more PBP color corrected structures, i.e., the optical block 160 includes at least one PBP liquid crystal lens and/or at least one PBP liquid crystal grating. Details of PBP liquid crystal lenses are discussed in detail below with regard to FIGS. 2A-2C. Details of PBP liquid crystal gratings are discussed in detail below with regard to FIGS. 3A-3C.

FIG. 2A is an example PBP liquid crystal lens 200, according to an embodiment. The PBP liquid crystal lens 200 creates a respective lens profile via an in-plane orientation ($\theta$, azimuth angle) of a liquid crystal molecule, in which the phase difference T=$2\theta$. In contrast, a conventional liquid crystal lens creates a lens profile via a birefringence ($\Delta n$) and layer thickness (d) of liquid crystals, and a number (#) of Fresnel zones (if it is Fresnel lens design), in which the phase difference T=$\Delta nd*\#*2\pi/\lambda$. Accordingly, in some embodiments, a PBP liquid crystal lens 200 may have a large aperture size and can be made with a very thin liquid crystal layer, which allows fast switching speed to turn the lens power on/off.

Design specifications for HMDs used for VR, AR, or MR applications typically requires a large range of optical power to adapt for human eye vergence-accommodation (e.g., ~±2 Diopters or more), fast switching speeds (e.g., ~300 ms), and a good quality image. Note conventional liquid crystal lenses are not well suited to these applications as, a conventional liquid crystal lens generally would require the liquid crystal to have a relatively high index of refraction or be relatively thick (which reduces switching speeds). In contrast, a PBP liquid crystal lens is able to meet design specs using a liquid crystal having a relatively low index of refraction, is thin (e.g., a single liquid crystal layer can be ~2 µm), and has high switching speeds (e.g., 300 ms).

FIG. 2B is an example of liquid crystal orientations 210 in the PBP liquid crystal lens 200 of FIG. 2A, according to an embodiment. In the PBP liquid crystal lens 200, an azimuth angle ($\theta$) of a liquid crystal molecule is continuously changed from a center 220 of the liquid crystal lens 200 to an edge 230 of the PBP liquid crystal lens 200, with a varied pitch A. Pitch is defined in a way that the azimuth angle of liquid crystal is rotated 180° from the initial state.

FIG. 2C is a section of liquid crystal orientations 240 taken along a y axis in the PBP liquid crystal lens 200 of FIG. 2A, according to an embodiment. It is apparent from the liquid crystal orientation 240 that a rate of pitch variation is a function of distance from the lens center 220. The rate of pitch variation increases with distance from the lens center. For example, pitch at the lens center ($\Lambda_0$), is the slowest and pitch at the edge 220 ($\Lambda_r$) is the highest, i.e., $\Lambda_0 > \Lambda_1 > \ldots > \Lambda_r$. In the x-y plane, to make a PBP liquid crystal lens with lens radius (r) and lens power (+/−f), the azimuth angle needs to meet: $2\theta = r^2/f*(\pi/\lambda)$, where $\lambda$ is the wavelength of light. Along with the z-axis, a dual twist or multiple twisted structure layers offers achromatic performance on efficiency in the PBP liquid crystal lens 200. Along with the z-axis, the non-twisted structure is simpler to fabricate then a twisted structure, but is configured for a monochromatic light.

Note that a PBP liquid crystal lens may have a twisted or non-twisted structure. In some embodiments, a stacked PBP liquid crystal lens structure may include one or more PBP liquid crystal lenses having a twisted structure, one or more PBP liquid crystal lenses having a non-twisted structure, or some combination thereof.

FIG. 3A is an example PBP liquid crystal grating 300, according to an embodiment. The PBP liquid crystal gratings 300 creates a respective grating profile via an in-plane orientation ($\theta$, azimuth angle) of a liquid crystal molecule, in which the phase difference T=$2\theta$.

FIG. 3B is an example of liquid crystal orientations 310 in the PBP liquid crystal grating 300 of FIG. 3A, according to an embodiment. In the PBP liquid crystal grating 300, an azimuth angle ($\theta$) of a liquid crystal molecule is continuously changed from a center 320 of the liquid crystal grating 300 to an edge 330 of the PBP liquid crystal grating 300, with a fixed pitch $\Lambda$. Pitch is defined in a way that the azimuth angle of liquid crystal is rotated 180° from the initial state.

FIG. 3C is a section of liquid crystal orientations 340 taken along a y axis in the PBP liquid crystal grating 300 of FIG. 3A, according to an embodiment. It is apparent from the liquid crystal orientation 340 that a rate of pitch variation is fixed and it is not a function of distance from the lens center 320. The rate of pitch variation does not change with distance from the lens center 320. For example, pitch at the lens center ($\Lambda_0$), is the same as pitch at the edge 320 ($\Lambda_r$), i.e., $\Lambda_0 = \Lambda_1 = \ldots = \Lambda_r$. In the x-y plane, to make a PBP liquid crystal grating with pitch $\Lambda$, a beam steering angle $\theta$ needs to meet: $\sin \theta = \lambda/\Lambda$, where $\lambda$ is the wavelength of light.

In some embodiments, PBP liquid crystal lenses and PBP liquid crystal gratings (i.e., PBP active elements) are coupled with switchable grating structures to form one or more PBP color corrected structure, as discussed in more detail below in conjunction with FIGS. 5A, 5B, 6A and 6B.

PBP liquid crystal lenses and PBP liquid crystal gratings may be active (also referred to as an active element) or passive (also referred to as a passive element). An active PBP liquid crystal lens has three optical states. The three optical states are an additive state, a neutral state, and a subtractive state. The additive state adds optical power to the system, the neutral state does not affect the optical power of the system (and does not affect the polarization of light passing through the active PBP liquid crystal), and the subtractive state subtracts optical power from the system. The state of an active PBP liquid crystal lens is determined by the handedness of polarization of light incident on the active PBP liquid crystal lens and an applied voltage. An active PBP liquid crystal operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. Note that if the active PBP liquid crystal lens is in the additive or subtractive state, light output from the active PBP liquid crystal lens has a handedness opposite that of the light input into the active PBP liquid crystal lens. In contrast, if the active PBP liquid crystal lens is in the neutral state, light output from the active PBP liquid crystal lens has the same handedness as the light input into the active PBP liquid crystal lens.

In contrast, a passive PBP liquid crystal lens has two optical states, specifically, an additive state and a subtractive state. The state of a passive PBP liquid crystal lens is determined by the handedness of polarization of light incident on the passive PBP liquid crystal lens. A passive PBP liquid crystal lens operates in a subtractive state responsive to incident light with a right handed polarization and operates in an additive state responsive to incident light with a left handed polarization. Note that the passive PBP liquid crystal lens outputs light that has a handedness opposite that of the light input into the passive PBP liquid crystal lens.

An active PBP liquid crystal grating has three optical states (i.e., additive, subtractive, and neutral) similar to that of an active PBP liquid crystal lens. But the functionality of the additive and the subtractive states are different in the case of the PBP liquid crystal grating. For example, in an additive state, instead of adding optical power to the system, the additive state causes the active PBP liquid crystal grating to diffract light at a particular wavelength to a positive angle ($+\theta$). Likewise, in the subtractive state, instead of subtracting optical power from the system, the subtractive state causes the active PBP liquid crystal grating to diffract light at the particular wavelength to a negative angle ($-\theta$). The neutral state does not cause any diffraction of light (and does not affect the polarization of light passing through the active PBP liquid crystal grating). The state of an active PBP liquid crystal grating is determined by a handedness of polarization of light incident on the active PBP liquid crystal grating and an applied voltage. An active PBP liquid crystal grating operates in a subtractive state responsive to incident light with a right handed circular polarization and an applied voltage of zero (or more generally below some minimal value), operates in an additive state responsive to incident light with a left handed circular polarization and the applied voltage of zero (or more generally below some minimal value), and operates in a neutral state (regardless of polarization) responsive to an applied voltage larger than a threshold voltage which aligns liquid crystal with positive dielectric anisotropy along with the electric field direction. Note that if the active PBP liquid crystal grating is in the additive or subtractive state, light output from the active PBP liquid crystal grating has a handedness opposite that of the light input into the active PBP liquid crystal grating. In contrast, if the active PBP liquid crystal grating is in the neutral state, light output from the active PBP liquid crystal grating has the same handedness as the light input into the active PBP liquid crystal grating.

Figure 4A:
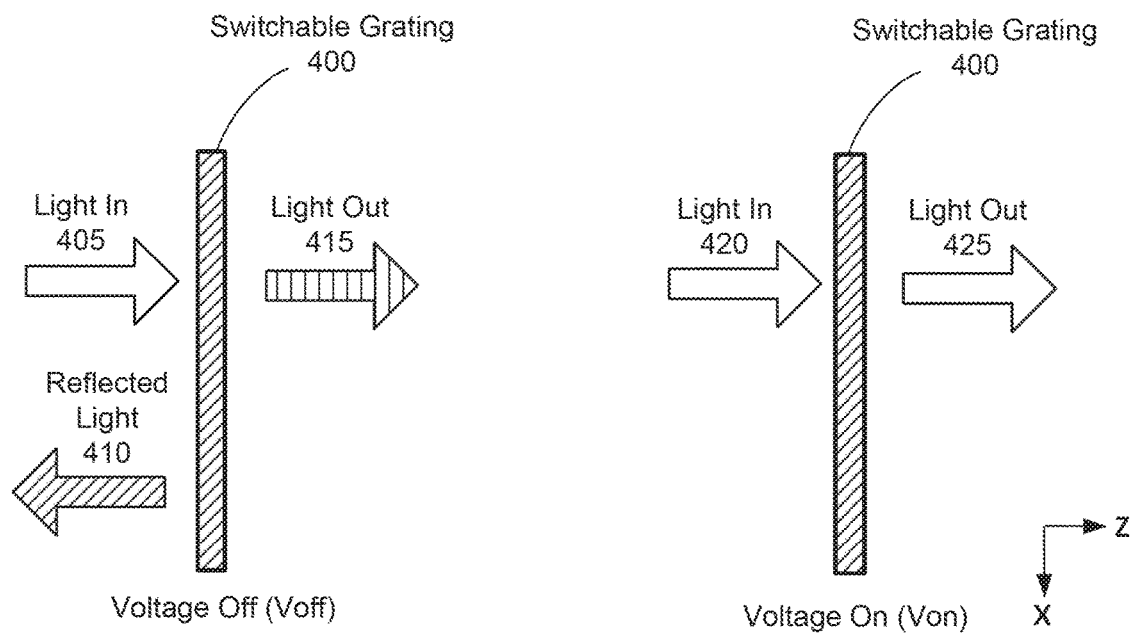
FIG. 4A is an example operation of a switchable grating structure, according to an embodiment.

FIG. 4A is an example operation of a switchable grating structure 400, according to an embodiment. In an embodiment, the switchable grating structure 400 is an electrically switchable Bragg grating. The electrically switchable Bragg grating is configured to have an inactive mode when a voltage level below a defined threshold is applied to the electrically switchable Bragg grating, i.e., when the electrically switchable Bragg grating is effectively turned off. In the inactive mode, the electrically switchable Bragg grating reflects light of a specific color channel, of a set of color channels, and transmit light of other color channels in the set of color channels, wherein the specific color channel is different for each of the plurality of electrically switchable Bragg grating. A color channel relates in this disclosure to a specific wavelength (or in some embodiments a range of wavelengths) of a multi-chromatic light, i.e., to a light of a specific color. The electrically switchable Bragg grating is further configured to have an active mode when a voltage level above a defined threshold is applied to the electrically switchable Bragg grating, i.e., when the electrically switchable Bragg grating is effectively turned on. In the active mode, the electrically switchable Bragg grating transmits light that is inclusive of the set of color channels, i.e., transmits the multi-chromatic light with all color channels. In some embodiments, the switchable grating structure 400 representing the electrically switchable Bragg grating can be configured to maintain polarization of transmitted light.

As shown in FIG. 4A, the switchable grating structure 400 is in an inactive state (i.e., turned off) when a voltage Voff below a defined threshold is applied to the switchable grating structure 400. In this case, as multi-chromatic light 405 comprising red, green and blue color channels illuminates the switchable grating structure 400, red color channel 410 is reflected back and multi-chromatic light 415 comprising green and blue color channels are transmitted by the switchable grating structure 400. On the other hand, when a voltage Von above a defined threshold is applied to the switchable grating structure 400, the switchable grating structure 400 is in an active state (i.e., turned on). Then, multi-chromatic light 420 comprising the red, green, and blue color channels are transmitted by the switchable grating structure 400, i.e., a multi-chromatic light 425 that is same as the multi-chromatic light 420 is output from the switchable grating structure 400.

Figure 4B:
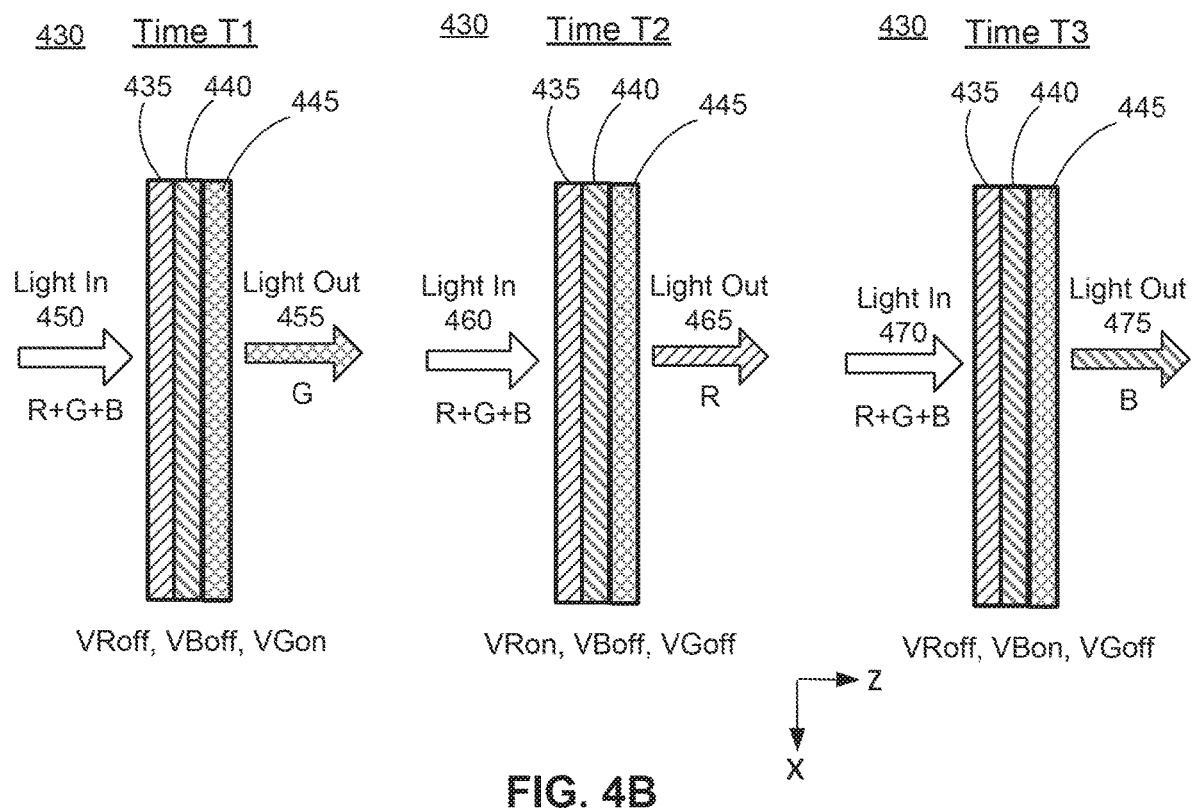
FIG. 4B is an example operation of a stacked switchable grating structure that operates as a time sequential color filter, according to an embodiment.

FIG. 4B is an example operation of a stacked switchable grating structure 430 that operates as a time sequential color filter, according to an embodiment. As shown in FIG. 4B, the stacked switchable grating structure 430 comprises a plurality of switchable gratings 435, 440, 445. Each individual switchable grating in the stacked switchable grating structure 430 is configured, when in inactive mode or turned off, to reflect light of a specific color channel and transmit light of other color channels. In an embodiment, each of the switchable gratings 435, 440, 445 is an electrically switchable Bragg grating that can be controlled based on a voltage level applied to that switchable grating. When turned off, the switchable grating 435 is configured to reflect red color channel, the switchable grating 440 is configured to reflect blue color channel, and the switchable grating 445 is configured to reflect green color channel.

In some embodiments, the stacked switchable grating structure 430 can be employed as a time sequential color filter. As shown in FIG. 4B, in time instant T1, voltage levels applied to the switchable gratings 435, 440, 445 are such that the switchable grating 435 is in inactive mode (turned off), the switchable grating 440 is in inactive mode (turned off) and the switchable grating 445 is in active mode (turned on). Thus, in time instant T1 when illuminated with multi-chromatic light 450 comprising red, green and blue color channels, the stacked switchable grating structure 430 transmits green color channel 455. The stacked switchable grating structure 430 also reflects red and blue color channels, which is not shown in FIG. 4B for simplicity. In time instant T2, voltage levels applied to the switchable gratings 435, 440, 445 are such that the switchable grating 435 is in active mode, the switchable grating 440 is in inactive mode and the switchable grating 445 is in inactive mode. Thus, in time instant T2 when illuminated with multi-chromatic light 460 comprising red, green and blue color channels, the stacked switchable grating structure 430 transmits red color channel 465. The stacked switchable grating structure 430 also reflects green and blue color channels, which is not shown in FIG. 4B for simplicity. In time instant T3, voltage levels applied to the switchable gratings 435, 440, 445 are such that the switchable grating 435 is in inactive mode, the switchable grating 440 is in active mode and the switchable grating 445 is in inactive mode. Thus, in time instant T3 when illuminated with multi-chromatic light 470 comprising red, green and blue color channels, the stacked switchable grating structure 430 transmits blue color channel 475. The stacked switchable grating structure 430 also reflects red and green color channels, which is not shown in FIG. 4B for simplicity. Hence, during sequential time instances T1, T2 and T3, the stacked switchable grating structure 430 operates as a time sequential color filter propagating light of a specific color (wavelength) in each time instant.

In some embodiments, switchable grating structures shown in FIGS. 4A and 4B can be assembled with either PBP liquid crystal gratings in FIGS. 3A-3C or PBP liquid crystal lenses in FIGS. 2A-2C to form a PBP color corrected structure that can be employed within an optical assembly in a HMD (e.g., the HMD 100 in FIG. 1A) to correct for chromatic aberration.

Figure 5A:
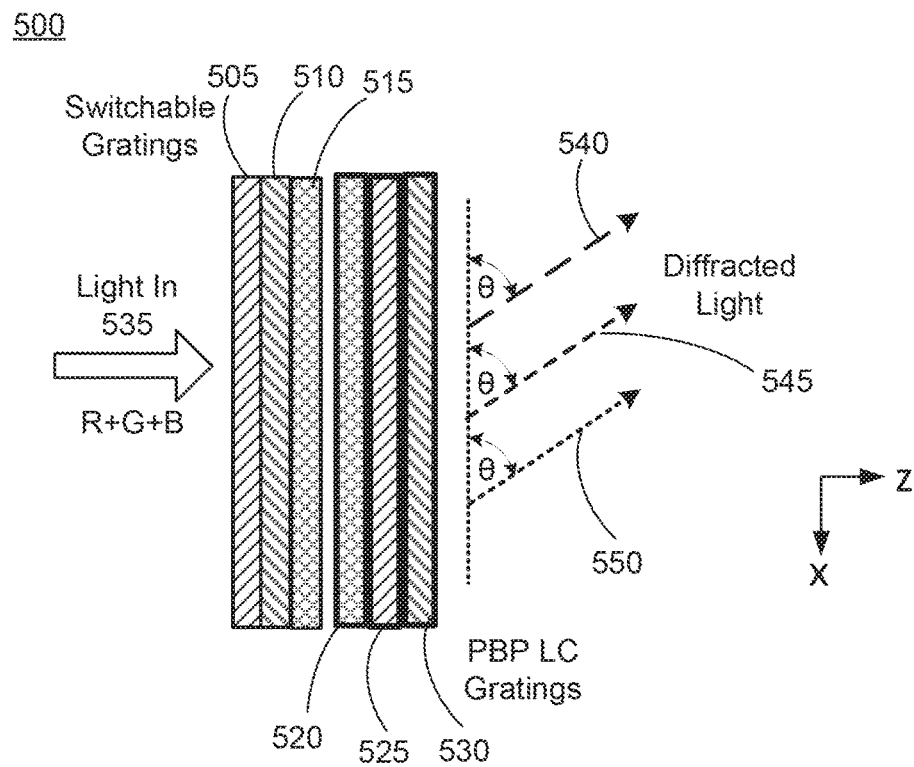
FIG. 5A is an example PBP color corrected structure that diffracts light by an angle common for a plurality of wavelengths, according to an embodiment.

FIG. 5A is an example PBP color corrected structure 500 that diffracts light by an angle common for a plurality of wavelengths, according to an embodiment. The PBP color corrected structure 500 comprises a plurality of switchable gratings 505, 510, 515 (e.g., electrically switchable Bragg gratings) stacked to each other and then coupled to a plurality of PBP liquid crystal gratings 520, 525, 530 that are also stacked to each other, as shown in FIG. 5A. When in inactive mode (turned off), the switchable grating 505 is configured to reflect red color channel and transmit green and blue color channels, the switchable grating 510 is configured to reflect blue color channel and transmit red and green color channels, and the switchable grating 515 is configured to reflect green color channel and transmit red and blue color channels. In some embodiments, each switchable grating 505, 510, 515 is configured to maintain polarization of light that is transmitted by that switchable grating 505, 510, 515. The stacked switchable gratings 505, 510, 515 operate as a time sequential color filter shown in FIG. 4B, i.e., the stacked switchable gratings 505, 510, 515 propagate light of a specific color (i.e., wavelength) in a specific time instant. As discussed in more detail below in conjunction with FIG. 7, the PBP liquid crystal grating 520 is configured by adjusting a length of a pitch to diffract only green color channel by an angle common for a set of color channels; the PBP liquid crystal grating 525 is configured by adjusting a length of a pitch to diffract only red color channel to the common angle; and the PBP liquid crystal grating 530 is configured by adjusting a length of a pitch to diffract only blue color channel to the common angle. Each PBP liquid crystal grating 520, 525, 530 is an active element that operates in a specific state (i.e., additive, subtractive, neutral) during a particular time instant, as discussed in more detail below.

In an illustrative embodiment, in time instant T1, the switchable gratings 505, 510 are in inactive modes (turned off) and the switchable grating 515 is in active mode (turned on). Therefore, green color channel from the multi-chromatic light 535 propagates through the stacked switchable gratings 505, 510, 515, whereas red and blue color channels are reflected. The propagated green color channel is then diffracted (steered) by the PBP liquid crystal grating 520 by a common angle θ to form an output beam 540, as shown in FIG. 5A. For a positive common diffraction angle θ shown in FIG. 5A, in the time instant T1, the multi-chromatic light 535 is left handed circularly polarized (LCP) light, the PBP liquid crystal grating 520 is in an additive state, the PBP liquid crystal gratings 525, 530 are in their neutral state, and the output beam 540 is right handed circularly polarized (RCP) light. For a negative common diffraction angle θ (not shown in FIG. 5A), the multi-chromatic light 535 is RCP light, the PBP liquid crystal grating 520 is in a subtractive state, the PBP liquid crystal gratings 525, 530 are in their neutral state, and the output beam 540 is LCP light. In time instant T2, the switchable gratings 510, 515 are in inactive modes (turned off) and the switchable grating 505 is in active mode (turned on). Therefore, red color channel from the multi-chromatic light 535 propagates through the stacked switchable gratings 505, 510, 515, whereas green and blue color channels are reflected. The propagated red color channel is then diffracted (steered) by the PBP liquid crystal grating 525 by the common angle θ to form an output beam 545, as shown in FIG. 5A. For a positive common diffraction angle θ shown in FIG. 5A, in the time instant T2, the multi-chromatic light 535 is LCP light, the PBP liquid crystal grating 525 is in an additive state, the PBP liquid crystal gratings 520, 530 are in their neutral state, and the output beam 545 is RCP light. For a negative common diffraction angle θ (not shown in FIG. 5A), the multi-chromatic light 535 is RCP light, the PBP liquid crystal grating 525 is in a subtractive state, the PBP liquid crystal gratings 520, 530 are in their neutral state, and the output beam 545 is LCP light. In time instant T3, the switchable gratings 505, 515 are in inactive modes (turned off) and the switchable grating 510 is inactive mode (turned on). Therefore, blue color channel from multi-chromatic light 535 propagates through the stacked switchable gratings 505, 510, 515, whereas red and green color channels are reflected. The propagated blue color channel is then diffracted (steered) by the PBP liquid crystal grating 530 by the common angle θ to form an output beam 550, as shown in FIG. 5A. For a positive common diffraction angle θ shown in FIG. 5A, in the time instant T3, the multi-chromatic light 535 is LCP light, the PBP liquid crystal grating 530 is in an additive state, the PBP liquid crystal gratings 520, 525 are in their neutral state, and the output beam 550 is RCP light. For a negative common diffraction angle θ (not shown in FIG. 5A), the multi-chromatic light 535 is RCP light, the PBP liquid crystal grating 530 is in a subtractive state, the PBP liquid crystal gratings 520, 525 are in their neutral state, and the output beam 550 is LCP light.

Figure 5B:
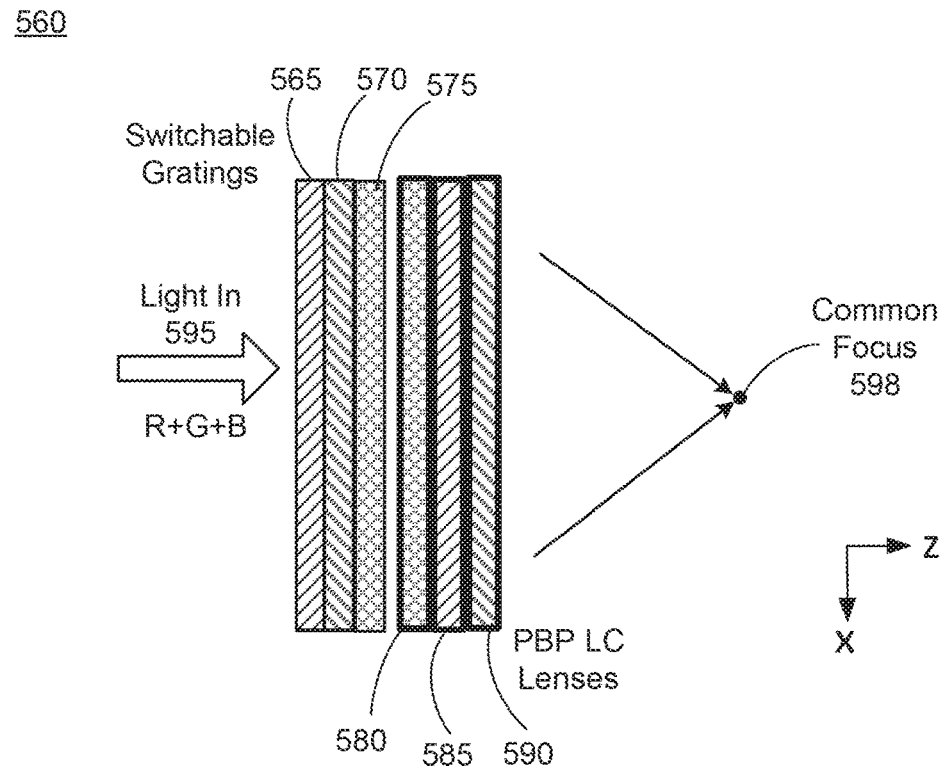
FIG. 5B is an example PBP color corrected structure that focuses light to a focus common for a plurality of wavelengths, according to an embodiment.

FIG. 5B is an example PBP color corrected structure 560 that focuses multi-chromatic light to a focus common for a set of color channels, according to an embodiment. The PBP color corrected structure 560 comprises a plurality of switchable gratings 565, 570, 575 (e.g., electrically switchable Bragg gratings) stacked to each other and coupled to a plurality of PBP liquid crystal lenses 580, 585, 590 that are also stacked to each other, as shown in FIG. 5B. When in inactive mode (turned off), the switchable grating 565 is configured to reflect red color channel and transmit green and blue color channels, the switchable grating 570 is configured to reflect blue color channel and transmit red and green color channels, and the switchable grating 575 is configured to reflect green color channel and transmit red and blue color channels. In some embodiments, each switchable grating 565, 570, 575 is configured to maintain polarization of light that is transmitted by that switchable grating 565, 570, 575. The stacked switchable gratings 565, 570, 575 operate as a time sequential color filter shown in FIG. 4B, i.e., the stacked switchable gratings 565, 570, 575 propagate light of a specific color (i.e., wavelength) in a specific time instant. As discussed in more detail below in conjunction with FIG. 8, the PBP liquid crystal lens 580 is configured by adjusting a liquid crystal rotating angle (azimuth angle) to focus only green color channel to a focus common for the set of color channels; the PBP liquid crystal lens 585 is configured by adjusting a liquid crystal rotating angle to focus only red color channel to the common focus; and the PBP liquid crystal lens 590 is configured by adjusting a liquid crystal rotating angle to focus only blue color channel to the common focus. Each PBP liquid crystal lens 580, 585, 590 is an active element that operates in a specific state (i.e., additive or neutral) during a particular time instant, as discussed in more detail below.

In an illustrative embodiment, in time instant T1, the switchable gratings 565, 570 are in inactive modes (turned off) and the switchable grating 575 is in active mode (turned on). Therefore, green color channel from the multi-chromatic light 595 propagates through the stacked switchable gratings 565, 570, 575, whereas red and blue color channels are reflected. In the time instant T1, the multi-chromatic light 595 is LCP light causing the PBP liquid crystal lens 580 to be in an additive state. The green color channel propagated by the stacked switchable gratings 565, 570, 575 in the time instant T1 is then focused by the PBP liquid crystal lens 580 to a focus 598. The PBP liquid crystal lenses 585, 590 are in their neutral state and the PBP liquid crystal lenses 585, 590 pass the light without any focusing/defocusing. In time instant T2, the switchable gratings 570, 575 are in inactive modes (turned off) and the switchable grating 565 is in active mode (turned on). Therefore, red color channel from the multi-chromatic light 595 propagates through the stacked switchable gratings 565, 570, 575, whereas green and blue color channels are reflected. In the time instant T2, the multi-chromatic light 595 is LCP light causing the PBP liquid crystal lens 585 to be in an additive state. The red color channel propagated by the stacked switchable gratings 565, 570, 575 in the time instant T2 is then focused by the PBP liquid crystal lens 585 to the focus 598. The PBP liquid crystal lenses 580, 590 are in their neutral state and the PBP liquid crystal lenses 580, 590 pass the light without any focusing/defocusing. In time instant T3, the switchable gratings 565, 575 are in inactive modes (turned off) and the switchable grating 570 is in active mode (turned on). Therefore, blue color channel from the multi-chromatic light 595 propagates through the stacked switchable gratings 565, 570, 575, whereas red and green color channels are reflected. In the time instant T3, the multi-chromatic light 595 is LCP light causing the PBP liquid crystal lens 590 to be in an additive state. The blue color channel propagated by the stacked switchable gratings 565, 570, 575 in the time instant T3 is then focused by the PBP liquid crystal lens 590 to the focus 598. The PBP liquid crystal lenses 580, 585 are in their neutral state and the PBP liquid crystal lenses 580, 585 pass the light without any focusing/defocusing.

Figure 6A:
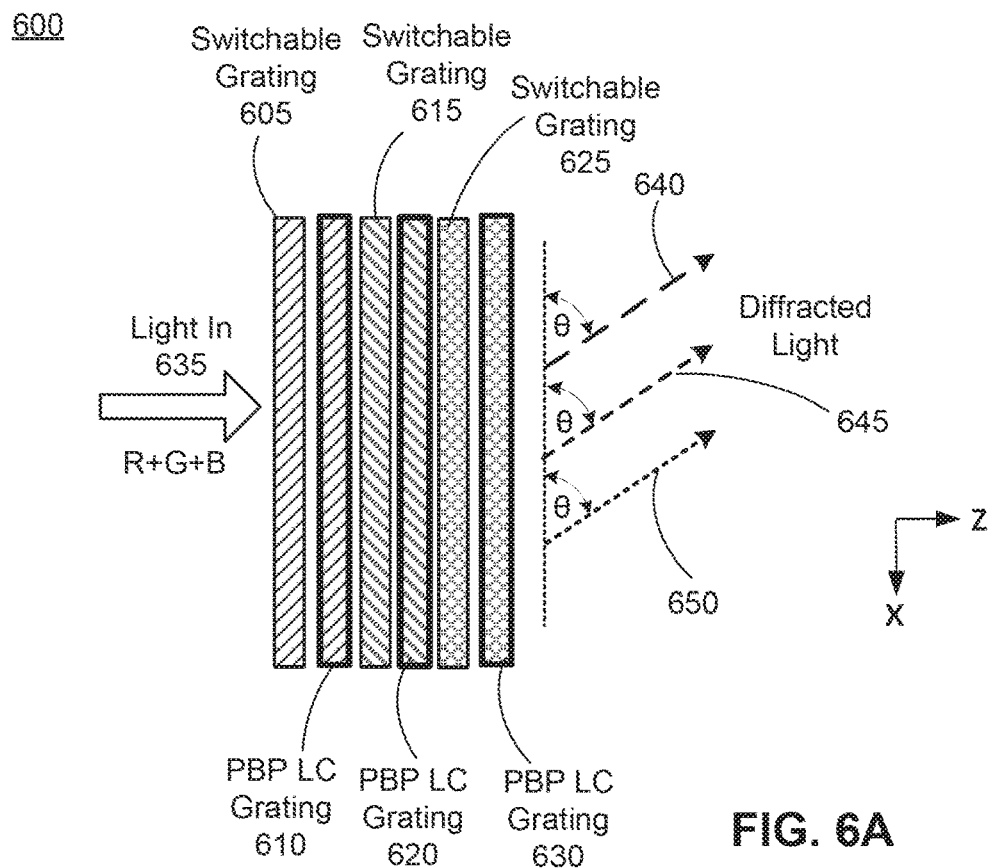
FIG. 6A is another example PBP color corrected structure that diffracts light by an angle common for a plurality of wavelengths, according to an embodiment.

FIG. 6A is an example PBP color corrected structure 600 that diffracts light by an angle common for a set of color channels, according to an embodiment. The PBP color corrected structure 600 comprises: a switchable grating 605 configured, when in inactive mode (turned off), to reflect red color channel and the switchable grating 605 is coupled to a PBP liquid crystal grating 610 configured to diffract red color channel by a common angle; a switchable grating 615 configured, when in inactive mode (turned off), to reflect blue color channel and the switchable grating 615 is coupled to a PBP liquid crystal grating 620 configured to diffract blue color channel by the common angle; and a switchable grating 625 configured, when in inactive mode (turned off), to reflect green color channel and the switchable grating 625 is coupled to a PBP liquid crystal grating 630 configured to diffract green color channel by the common angle. In some embodiments, each switchable grating 605, 615, 625 is configured to maintain polarization of light that is transmitted by that switchable grating 605, 615, 625. The switchable gratings 605, 615, 625 (e.g., electrically switchable Bragg gratings) operate as a time sequential color filter shown in FIG. 4B, i.e., the switchable gratings 605, 615, 625 propagate light of a specific color (i.e., wavelength) in a specific time instant. Each PBP liquid crustal grating 610, 620, 630 is an active element that operates in a specific state (i.e., additive, subtractive, neutral) during a particular time instant, as discussed in more detail below.

In an illustrative embodiment, in time instant T1, the switchable gratings 605, 615 are in inactive modes (turned off) and the switchable grating 625 is in active mode (turned on). Therefore, green color channel from the multi-chromatic light 635 propagates through and is diffracted (steered) by the PBP liquid crystal grating 630 by a common angle $\theta$ to form an output beam 640, as shown in FIG. 6A. In the same time, red and blue color channels are reflected from the PBP color corrected structure 600. For a positive common diffraction angle $\theta$ shown in FIG. 6A, in the time instant T1, the multi-chromatic light 635 is LCP light, the PBP liquid crystal grating 630 is in an additive state, the PBP liquid crystal gratings 610, 620 are in their neutral state, and the output beam 640 is RCP light. For a negative common diffraction angle $\theta$ (not shown in FIG. 6A), the multi-chromatic light 635 is RCP light, the PBP liquid crystal grating 630 is in a subtractive state, the PBP liquid crystal gratings 610, 620 are in their neutral state, and the output beam 640 is LCP light. In time instant T2, the switchable gratings 615, 625 are in inactive modes (turned off) and the switchable grating 605 is in active mode (turned on). Therefore, red color channel from the multi-chromatic light 635 propagates through and is diffracted (steered) by the PBP liquid crystal grating 610 by the common angle $\theta$ to form an output beam 645, as shown in FIG. 6A. In the same time, green and blue color channels are reflected from the PBP color corrected structure 600. For a positive common diffraction angle $\theta$ shown in FIG. 6A, in the time instant T2, the multi-chromatic light 635 is LCP light, the PBP liquid crystal grating 610 is in an additive state, the PBP liquid crystal gratings 620, 630 are in their neutral state, and the output beam 645 is RCP light. For a negative common diffraction angle $\theta$ (not shown in FIG. 6A), the multi-chromatic light 635 is RCP light, the PBP liquid crystal grating 610 is in a subtractive state, the PBP liquid crystal gratings 620, 630 are in their neutral state, and the output beam 645 is LCP light. In time instant T3, the switchable gratings 605, 625 are in inactive modes (turned off) and the switchable grating 615 is in active mode (turned on). Therefore, blue color channel from the multi-chromatic light 635 propagates through and is diffracted (steered) by the PBP liquid crystal grating 620 by the common angle $\theta$ to form an output beam 650, as shown in FIG. 6A. In the same time, red and green color channels are reflected from the PBP color corrected structure 600. For a positive common diffraction angle $\theta$ shown in FIG. 6A, in the time instant T3, the multi-chromatic light 635 is LCP light, the PBP liquid crystal grating 620 is in an additive state, the PBP liquid crystal gratings 610, 630 are in their neutral state, and the output beam 650 is RCP light. For a negative common diffraction angle θ (not shown in FIG. 6A), the multi-chromatic light 635 is RCP light, the PBP liquid crystal grating 620 is in a subtractive state, the PBP liquid crystal gratings 610, 630 are in their neutral state, and the output beam 650 is LCP light.

Figure 6B:
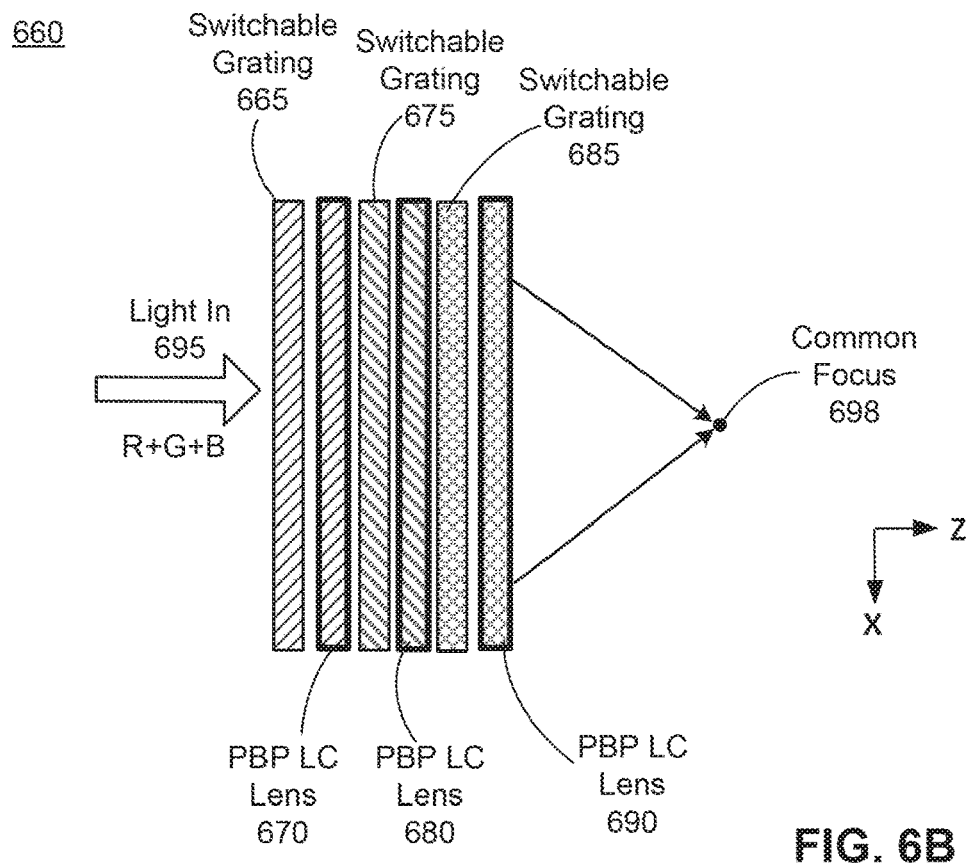
FIG. 6B is another example PBP color corrected structure that focuses light to a focus common for a plurality of wavelengths, according to an embodiment.

FIG. 6B is an example PBP color corrected structure 660 that focuses light to a focus common for a set of color channels, according to an embodiment. The PBP color corrected structure 660 comprises: a switchable grating 665 configured, when in inactive mode (turned off), to reflect red color channel and the switchable grating 665 is coupled to a PBP liquid crystal lens 670 configured to focus red color channel to a common focus; a switchable grating 675 configured, when in inactive mode (turned off), to reflect blue color channel and the switchable grating 675 is coupled to a PBP liquid crystal lens 680 configured to focus blue color channel to the common focus; and a switchable grating 685 configured, when in inactive mode (turned off), to reflect green color channel and the switchable grating 685 is coupled to a PBP liquid crystal lens 690 configured to focus green color channel to the common focus. In some embodiments, each switchable grating 665, 675, 685 is configured to maintain polarization of light that is transmitted by that switchable grating 665, 675, 685. The switchable gratings 665, 675, 685 (e.g., electrically switchable Bragg gratings) operate as a time sequential color filter shown in FIG. 4B, i.e., the switchable gratings 665, 675, 685 propagate light of a specific color (i.e., wavelength) in a specific time instant. Each PBP liquid crustal lens 670, 680, 690 is an active element that operates in a specific state (i.e., additive or neutral) during a particular time instant, as discussed in more detail below.

In an illustrative embodiment, in time instant T1, the switchable gratings 665, 675 are in inactive modes (turned off) and the switchable grating 685 is in active mode (turned on). Therefore, green color channel from multi-chromatic light 695 propagates through, whereas red and blue color channels are reflected. In the time instant T1, the multi-chromatic light 695 is LCP light causing the PBP liquid crystal lens 690 to be in an additive state. The green color channel propagated in the time instant T1 is then focused by the PBP liquid crystal lens 690 to a focus 698. The PBP liquid crystal lenses 670, 680 are in their neutral state and the PBP liquid crystal lenses 670, 680 pass the light without any focusing/defocusing. In time instant T2, the switchable gratings 675, 685 are in inactive modes (turned off) and the switchable grating 665 is in active mode (turned on). Therefore, red color channel from the multi-chromatic light 695 propagates through, whereas green and blue color channels are reflected. In the time instant T2, the multi-chromatic light 695 is LCP light causing the PBP liquid crystal lens 670 to be in an additive state. The red color channel propagated in the time instant T2 is then focused by the PBP liquid crystal lens 670 to the focus 698. The PBP liquid crystal lenses 680, 690 are in their neutral state and the PBP liquid crystal lenses 680, 690 pass the light without any focusing/defocusing. In time instant T3, the switchable gratings 665, 685 are in inactive modes (turned off) and the switchable grating 675 is in active mode (turned on). Therefore, blue color channel from the multi-chromatic light 695 propagates through, whereas red and green color channels are reflected. In the time instant T3, the multi-chromatic light 695 is LCP light causing the PBP liquid crystal lens 680 to be in an additive state. The blue color channel propagated in the time instant T3 is then focused by the PBP liquid crystal lens 680 to the focus 698. The PBP liquid crystal lenses 670, 690 are in their neutral state and the PBP liquid crystal lenses 670, 690 pass the light without any focusing/defocusing.

Figure 7:
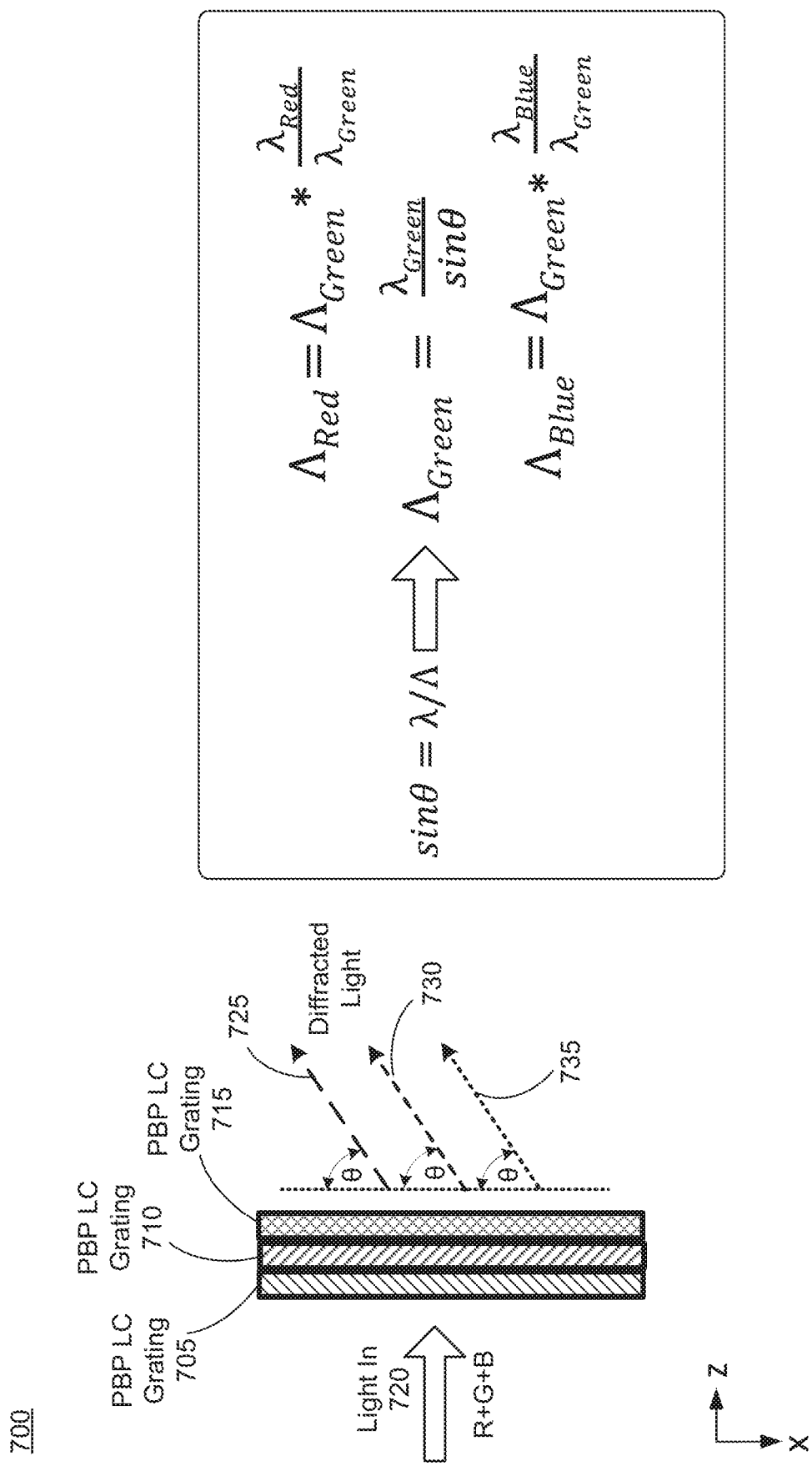
FIG. 7 is an example design of PBP liquid crystal gratings for steering light of different wavelengths to a common angle, in accordance with an embodiment.

FIG. 7 is an example design 700 of PBP liquid crystal gratings for steering (diffracting) light of different color channels by a common angle, in accordance with an embodiment. The design 700 shown in FIG. 7 comprises a PBP liquid crystal grating 705 configured to diffract a green color channel 725 of an input multi-chromatic light 720 by a common angle θ. The PBP liquid crystal grating 705 may correspond to the PBP liquid crystal grating 520 in FIG. 5A that diffracts the green color channel 540 by the common angle θ, or may correspond to the PBP liquid crystal grating 610 in FIG. 6A that diffracts the green color channel 640 by the common angle θ. The design 700 further comprises a PBP liquid crystal grating 710 configured to diffract a red color channel 730 of the multi-chromatic light 720 by the common angle θ. The PBP liquid crystal grating 710 may correspond to the PBP liquid crystal grating 525 in FIG. 5A that diffracts the red color channel 545 by the common angle θ, or may correspond to the PBP liquid crystal grating 620 in FIG. 6A that diffracts the red color channel 645 by the common angle θ. The design 700 further comprises a PBP liquid crystal grating 715 configured to diffract a blue color channel 735 of the multi-chromatic light 720 by the common angle θ. The PBP liquid crystal grating 715 may correspond to the PBP liquid crystal grating 530 in FIG. 5A that diffracts the blue color channel 550 by the common angle θ, or may correspond to the PBP liquid crystal grating 630 in FIG. 6A that diffracts the red color channel 650 by the common angle θ.

In order to steer light of different color channels (wavelengths) to the common angle θ, a pitch Λ for each PBP liquid crystal grating is designed appropriately. For the PBP liquid crystal grating 705 to diffract (steer) the green color channel 725 by the common angle θ, pitch $\Lambda_{green}$ of the PBP liquid crystal grating 705 needs to satisfy $\Lambda_{green}=\lambda_{green}/\sin\theta$; for the PBP liquid crystal grating 710 to diffract the red color channel 730 by the common angle θ, pitch $\Lambda_{red}$ of the PBP liquid crystal grating 710 needs to satisfy $\Lambda_{red}=\Lambda_{green}\cdot(\lambda_{red}/\lambda_{green})$, i.e., the pitch of the PBP liquid crystal grating 710 is longer than the pitch of the PBP liquid crystal grating 705; for the PBP liquid crystal grating 715 to diffract the blue color channel 735 to the common angle θ, pitch $\Lambda_{blue}$ of the PBP liquid crystal grating 715 needs to satisfy $\Lambda_{blue}=\Lambda_{green}\cdot(\lambda_{blue}/\lambda_{green})$, i.e., the pitch of the PBP liquid crystal grating 715 is shorter than the pitch of the PBP liquid crystal grating 705 and the pitch of the PBP liquid crystal grating 710.

Figure 8:
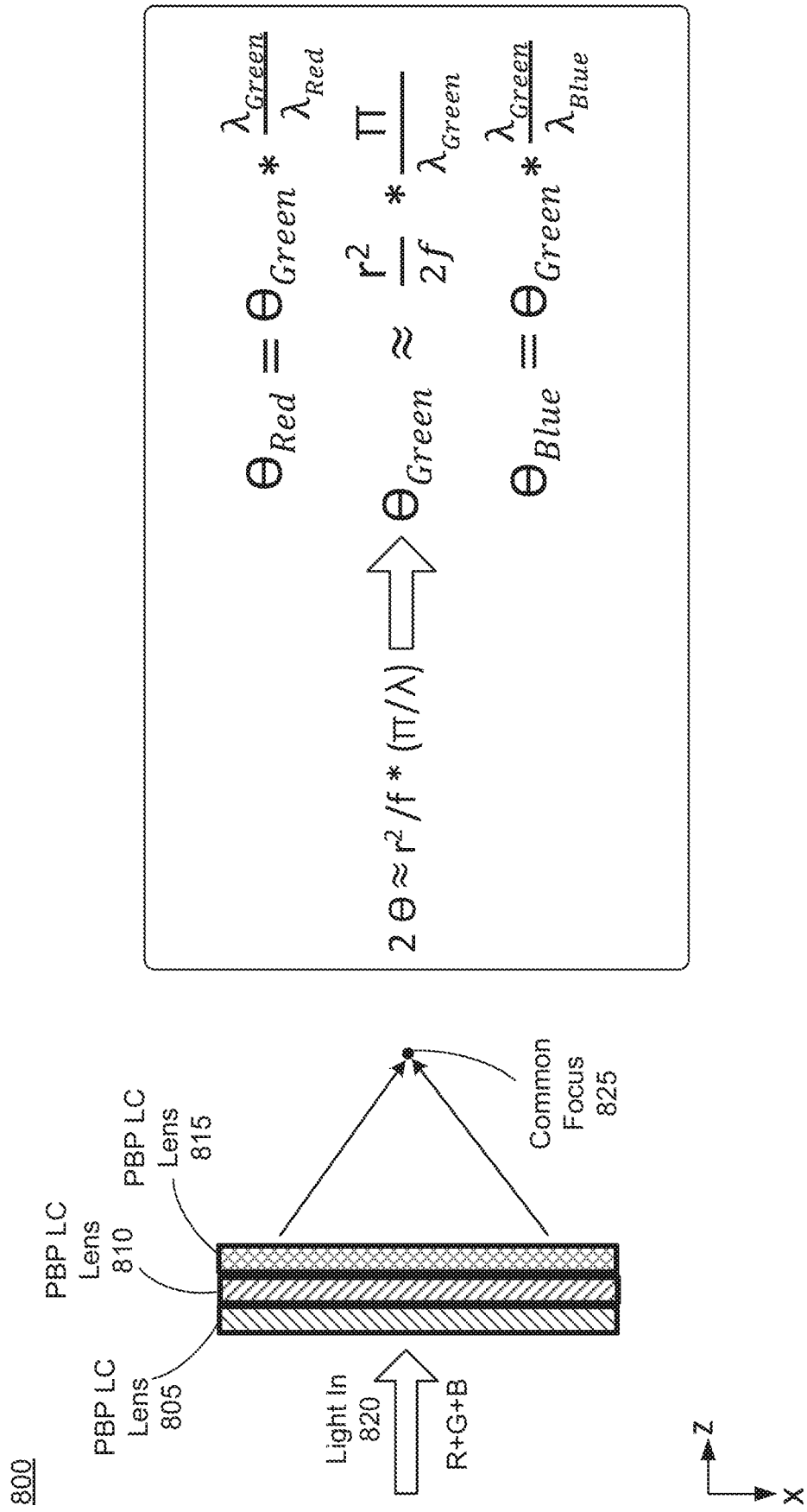
FIG. 8 is an example design of PBP liquid crystal lenses for focusing light of different wavelengths to a common focus, in accordance with an embodiment

FIG. 8 is an example design 800 of PBP liquid crystal lenses for focusing light of different color channels (wavelengths) to a common focus, in accordance with an embodiment. The design 800 shown in FIG. 8 comprises a PBP liquid crystal lens 805 configured to focus a green color channel of an input multi-chromatic light 820 to a common focus 825. The PBP liquid crystal lens 805 may correspond to the PBP liquid crystal lens 580 in FIG. 5B that focuses the green color channel to the common focus 598, or may correspond to the PBP liquid crystal lens 670 in FIG. 6B that focuses the green color channel to the common focus 698. The design 800 further comprises a PBP liquid crystal lens 810 configured to focus a red color channel of the multi-chromatic light 820 to the common focus 825. The PBP liquid crystal lens 810 may correspond to the PBP liquid crystal lens 585 in FIG. 5B that focuses the red color channel to the common focus 598, or may correspond to the PBP liquid crystal lens 680 in FIG. 6B that focuses the red color channel to the common focus 698. The design 800 further comprises a PBP liquid crystal lens 815 configured to focus a blue color channel of the multi-chromatic light 820 to the common focus 825. The PBP liquid crystal lens 815 may correspond to the PBP liquid crystal lens 590 in FIG. 5B that focuses the blue color channel to the common focus 598, or may correspond to the PBP liquid crystal lens 690 in FIG. 6B that focuses the blue color channel to the common focus 698.

In order to focus light of different color channels to the common focus f (i.e., to the common focus 825 shown in FIG. 8), a liquid crystal phase or liquid crystal rotation speed (or azimuth angle) θ for each PBP liquid crystal lens is designed appropriately. For the PBP liquid crystal lens 805 to focus the green color channel to the common focus f, a liquid crystal rotation speed of the PBP liquid crystal lens 805 needs to satisfy $$\theta_{green} = \frac{r^2}{2f} \cdot \frac{\pi}{\lambda_{green}};$$

for the PBP liquid crystal lens 810 to focus the red color channel to the common focus f, a liquid crystal rotation speed of the PBP liquid crystal lens 810 needs to satisfy $\theta_{red} = \theta_{red} \cdot (\lambda_{green}/\lambda_{red})$, i.e., the liquid crystal rotation speed of the PBP liquid crystal lens 810 is slower than the liquid crystal rotation speed of the PBP liquid crystal lens 805; for the PBP liquid crystal lens 815 to focus the blue color channel to the common focus f, a liquid crystal rotation speed of the PBP liquid crystal lens 815 needs to satisfy $\theta_{blue} = \theta_{green} \cdot (\lambda_{green}/\lambda_{blue})$, i.e., the liquid crystal rotation speed of the PBP liquid crystal lens 815 is faster than the liquid crystal rotation speed of the PBP liquid crystal lens 805 and the liquid crystal rotation speed of the PBP liquid crystal lens 810.

Figure 9:
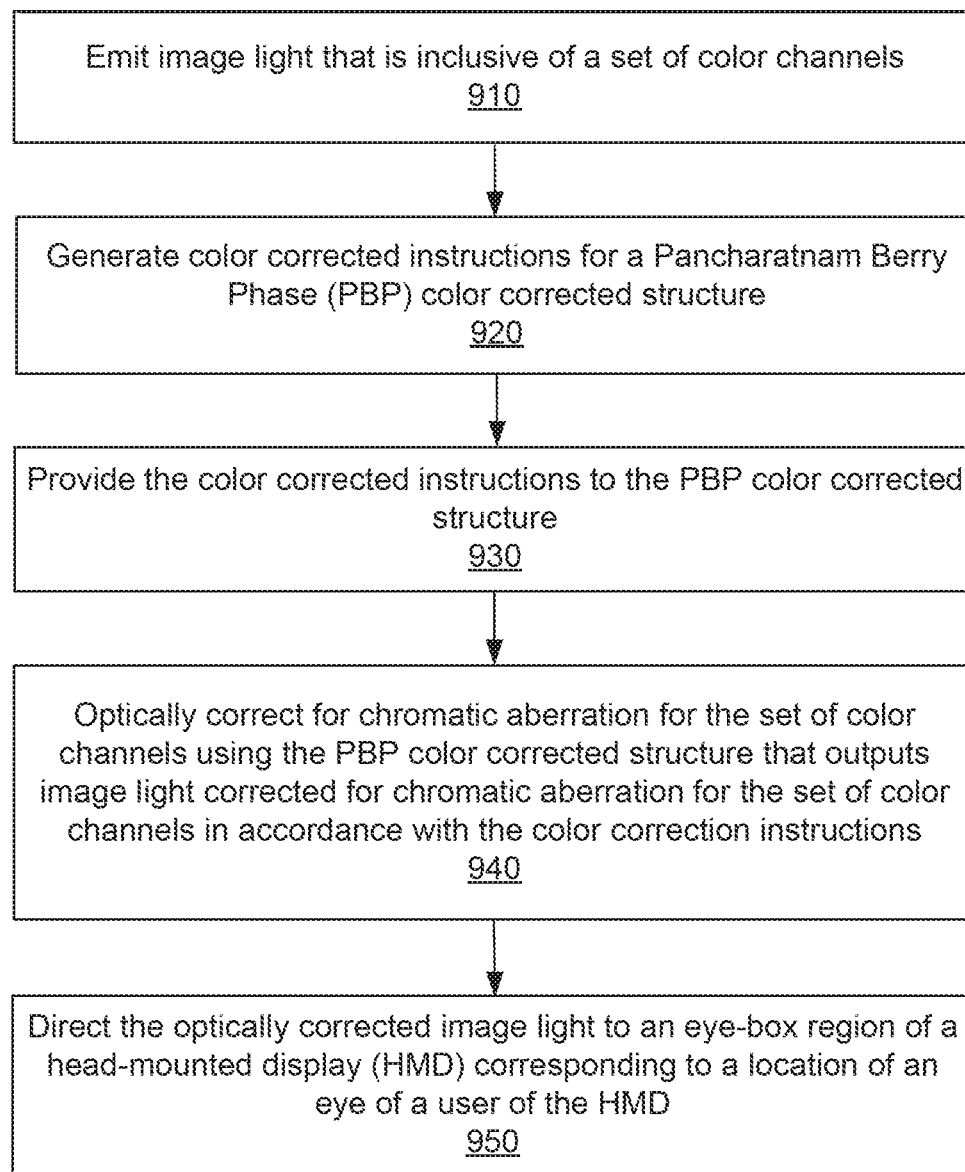
FIG. 9 is a flow chart illustrating a process of operating a PBP color corrected structure, which may be implemented at the HMD shown in FIG. 1A, in accordance with an embodiment.

FIG. 9 is a flow chart illustrating a process 900 of operating a PBP color corrected structure, which may be part of a HMD, in accordance with an embodiment. The process 900 of FIG. 9 may be performed by the components of a HMD (e.g., the HMD 100). Other entities may perform some or all of the steps of the process in other embodiments. Likewise, embodiments may include different and/or additional steps, or perform the steps in different orders.

The HMD emits 910 (e.g., via an electronic display) an image light that is inclusive of a set of color channels. The HMD includes an optical assembly with a PBP color corrected structure. The PBP color corrected structure comprises a plurality of switchable gratings and a plurality of PBP active elements. The plurality of switchable gratings are each configured to have an inactive mode to reflect light of a specific color channel, of the set of color channels, and transmit light of other color channels in the set of color channels, wherein the specific color channel is different for each of the plurality of switchable gratings. Each switchable grating is also configured to have an active mode to transmit light that is inclusive of the set of color channels. The plurality of PBP active elements receive a portion of the image light output from at least one of the plurality of switchable gratings, and the plurality of PBP active elements are each configured to adjust light of a different color channel of the set of color channels by a same amount to generate optically corrected image light for chromatic aberration for the set of color channels.

The HMD generates 920 (e.g., via a controller) color correction instructions for the PBP color corrected structure. In some embodiments, the HMD generates the color correction instructions in a plurality of time instants to control at least operations of the switchable gratings in the PBP color corrected structure. For each sequential time instant, the HMD generates a specific color correction instruction that deactivates a different subset of the switchable gratings and activates a different one of the switchable gratings. In this way, in each time instant, the switchable gratings transmit light of the different color channel, i.e., the switchable gratings operate as a time sequential color filter based on the color correction instructions.

The HMD provides 930 (e.g., via the controller) the color correction instructions to the PBP color corrected structure. In each time instant of the plurality of time instants, the HMD provides a specific color correction instruction to at least the switchable gratings of the PBP color corrected structure. Based on the color correction instruction, a different subset of the switchable gratings is deactivated and a different one of the switchable gratings is activated for each time instant.

The HMD optically corrects 940 (e.g., via the optical assembly) for chromatic aberration for the set of color channels using the PBP color corrected structure that outputs the image light corrected for chromatic aberration for the set of color channels in accordance with the color correction instructions.

The HMD directs 950 (e.g., via the optical assembly) the optically corrected image light to an eye-box region of the MID corresponding to a location of an eye of a user of the HMD.

System Environment

Figure 10:
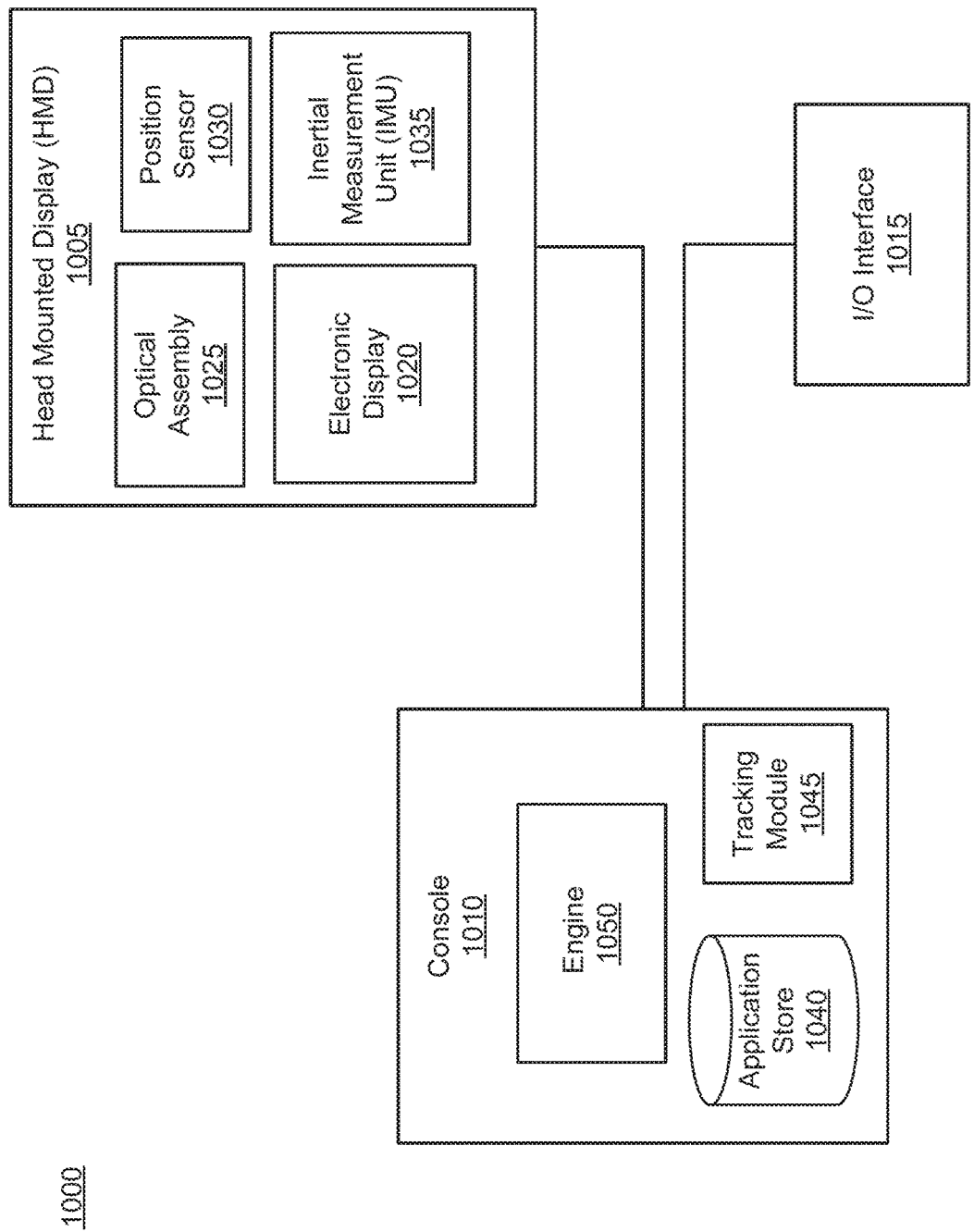
FIG. 10 is a block diagram of a system environment that includes the HMD shown in FIG. 1A, in accordance with an embodiment.

FIG. 10 is a block diagram of one embodiment of a MID system 1000 in which a console 1010 operates. The HMD system 1000 may operate in a VR system environment, an AR system environment, a MR system environment, or some combination thereof. The MID system 1000 shown by FIG. 10 comprises an HMD 1005 and an input/output (I/O) interface 1015 that is coupled to the console 1010. While FIG. 10 shows an example HMD system 1000 including one HMD 1005 and on I/O interface 1015, in other embodiments any number of these components may be included in the HMD system 1000. For example, there may be multiple HMDs 1005 each having an associated I/O interface 1015, with each HMD 1005 and I/O interface 1015 communicating with the console 1010. In alternative configurations, different and/or additional components may be included in the HMD system 1000. Additionally, functionality described in conjunction with one or more of the components shown in FIG. 10 may be distributed among the components in a different manner than described in conjunction with FIG. 10 in some embodiments. For example, some or all of the functionality of the console 1010 is provided by the HMD 1005.

The HMD 1005 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 1005, the console 1010, or both, and presents audio data based on the audio information. The HMD 1005 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 1005 is the HMD 100 described above in conjunction with FIG. 1A.

The HMD 1005 includes an electronic display 1020, an optical assembly 1025, one or more position sensors 1030, and an IMU 1035. Some embodiments of the HMD 1005 have different components than those described in conjunction with FIG. 10. Additionally, the functionality provided by various components described in conjunction with FIG. 10 may be differently distributed among the components of the HMD 1005 in other embodiments.

The electronic display 1020 displays 2D or 3D images to the user in accordance with data received from the console 1010. In various embodiments, the electronic display 1020 comprises a single electronic display or multiple electronic displays (e.g., a display for each eye of a user). Examples of the electronic display 1020 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 1025 magnifies image light received from the electronic display 1020, corrects optical errors associated with the image light, and presents the corrected image light to a user of the MID 1005. In various embodiments, the optical assembly 1025 includes one or more optical elements. Example optical elements included in the optical assembly 1025 include: an aperture, a Fresnel lens, a convex lens, a concave lens, a filter, a reflecting surface, or any other suitable optical element that affects image light. Moreover, the optical assembly 1025 may include combinations of different optical elements. In some embodiments, one or more of the optical elements in the optical assembly 1025 may have one or more coatings, such as partially reflective or anti-reflective coatings.

Magnification and focusing of the image light by the optical assembly 1025 allows the electronic display 1020 to be physically smaller, weigh less and consume less power than larger displays. Additionally, magnification may increase the field of view of the content presented by the electronic display 1020. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 1025 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 1020 for display is pre-distorted, and the optical assembly 1025 corrects the distortion when it receives image light from the electronic display 1020 generated based on the content.

The optical assembly 1025 comprises at least one PBP color corrected structure as discussed above in conjunction with FIGS. 5A, 5B, 6A and 6B. The optical assembly 1025 is configured to optically correct for chromatic aberration an image light emitted from the electronic display 1020 that is inclusive of a set of color channels. The optical assembly 1025 optically corrects for chromatic aberration for the set of color channels using the PBP color corrected structure that outputs image light corrected for chromatic aberration for the set of color channels in accordance with color correction instructions. The optical assembly 1025 is further configured to direct the optically corrected image light to an eye-box region of the HMD 1005 corresponding to a location of an eye of a user of the HMD 1005.

The IMU 1035 is an electronic device that generates data indicating a position of the HMD 1005 based on measurement signals received from one or more of the position sensors 1030. A position sensor 1030 generates one or more measurement signals in response to motion of the HMD 1005. Examples of position sensors 1030 include: one or more accelerometers, one or more gyroscopes, one or more magnetometers, another suitable type of sensor that detects motion, a type of sensor used for error correction of the IMU 1035, or some combination thereof. The position sensors 1030 may be located external to the IMU 1035, internal to the IMU 1035, or some combination thereof.

Based on the one or more measurement signals from one or more position sensors 1030, the IMU 1035 generates data indicating an estimated current position of the HMD 1005 relative to an initial position of the HMD 1005. For example, the position sensors 1030 include multiple accelerometers to measure translational motion (forward/back, up/down, left/right) and multiple gyroscopes to measure rotational motion (e.g., pitch, yaw, roll). In some embodiments, the IMU 1035 rapidly samples the measurement signals and calculates the estimated current position of the HMD 1005 from the sampled data. For example, the IMU 1035 integrates the measurement signals received from the accelerometers over time to estimate a velocity vector and integrates the velocity vector over time to determine an estimated current position of a reference point on the HMD 1005. Alternatively, the IMU 1035 provides the sampled measurement signals to the console 1010, which interprets the data to reduce error. The reference point is a point that may be used to describe the position of the HMD 1005. The reference point may generally be defined as a point in space or a position related to the HMD's 1005 orientation and position.

The IMU 1035 receives one or more parameters from the console 1010. The one or more parameters are used to maintain tracking of the HMD 1005. Based on a received parameter, the IMU 1035 may adjust one or more IMU parameters (e.g., sample rate). In some embodiments, certain parameters cause the IMU 1035 to update an initial position of the reference point so it corresponds to a next position of the reference point. Updating the initial position of the reference point as the next calibrated position of the reference point helps reduce accumulated error associated with the current position estimated the IMU 1035. The accumulated error, also referred to as drift error, causes the estimated position of the reference point to "drift" away from the actual position of the reference point over time. In some embodiments of the HMD 1005, the IMU 1035 may be a dedicated hardware component. In other embodiments, the IMU 1035 may be a software component implemented in one or more processors.

The I/O interface 1015 is a device that allows a user to send action requests and receive responses from the console 1010. An action request is a request to perform a particular action. For example, an action request may be an instruction to start or end capture of image or video data or an instruction to perform a particular action within an application. The I/O interface 1015 may include one or more input devices. Example input devices include: a keyboard, a mouse, a game controller, or any other suitable device for receiving action requests and communicating the action requests to the console 1010. An action request received by the I/O interface 1015 is communicated to the console 1010, which performs an action corresponding to the action request. In some embodiments, the I/O interface 1015 includes an IMU 1040 that captures calibration data indicating an estimated position of the I/O interface 1015 relative to an initial position of the I/O interface 1015. In some embodiments, the I/O interface 1015 may provide haptic feedback to the user in accordance with instructions received from the console 1010. For example, haptic feedback is provided when an action request is received, or the console 1010 communicates instructions to the I/O interface 1015 causing the I/O interface 1015 to generate haptic feedback when the console 1010 performs an action.

The console 1010 provides content to the HMD 1005 for processing in accordance with information received from one or more of: the HMD 1005, and the I/O interface 1015. In the example shown in FIG. 10, the console 1010 includes an application store 1040, a tracking module 1045, and an engine 1050. Some embodiments of the console 1010 have different modules or components than those described in conjunction with FIG. 10. Similarly, the functions further described below may be distributed among components of the console 1010 in a different manner than described in conjunction with FIG. 10.

The application store 1040 stores one or more applications for execution by the console 1010. An application is a group of instructions, that when executed by a processor, generates content for presentation to the user. Content generated by an application may be in response to inputs received from the user via movement of the HMD 1005 or the I/O interface 1015. Examples of applications include: gaming applications, conferencing applications, video playback applications, or other suitable applications.

The tracking module 1045 calibrates the HMD system 1000 using one or more calibration parameters and may adjust one or more calibration parameters to reduce error in determination of the position of the HMD 1005 or of the I/O interface 1015. Calibration performed by the tracking module 1045 also accounts for information received from the IMU 1035 in the HMD 1005 and/or an IMU 1035 included in the I/O interface 1015. Additionally, if tracking of the HMD 1005 is lost, the tracking module 1045 may re-calibrate some or all of the HMD system 1000.

The tracking module 1045 tracks movements of the HMD 1005 or of the I/O interface 1015 using information from the one or more position sensors 1030, the IMU 1035 or some combination thereof. For example, the tracking module 1045 determines a position of a reference point of the HMD 1005 in a mapping of a local area based on information from the HMD 1005. The tracking module 1045 may also determine positions of the reference point of the HMD 1005 or a reference point of the I/O interface 1015 using data indicating a position of the HMD 1005 from the IMU 1035 or using data indicating a position of the I/O interface 1015 from an IMU 1035 included in the I/O interface 1015, respectively. Additionally, in some embodiments, the tracking module 1045 may use portions of data indicating a position or the HMD 1005 from the IMU 1035 to predict a future location of the HMD 1005. The tracking module 1045 provides the estimated or predicted future position of the HMD 1005 or the I/O interface 1015 to the engine 1050.

The engine 1050 generates a 3D mapping of the area surrounding the HMD 1005 (i.e., the "local area") based on information received from the HMD 1005. In some embodiments, the engine 1050 determines depth information for the 3D mapping of the local area based on information received from the DCA 420 that is relevant for techniques used in computing depth. The engine 1050 may calculate depth information using one or more techniques in computing depth (e.g., structured light, time or flight, or some combination thereof).

The engine 1050 also executes applications within the HMD system 1000 and receives position information, acceleration information, velocity information, predicted future positions, or some combination thereof, of the HMD 1005 from the tracking module 1045. Based on the received information, the engine 1050 determines content to provide to the HMD 1005 for presentation to the user. For example, if the received information indicates that the user has looked to the left, the engine 1050 generates content for the HMD 1005 that mirrors the user's movement in a virtual environment or in an environment augmenting the local area with additional content. Additionally, the engine 1050 performs an action within an application executing on the console 1010 in response to an action request received from the I/O interface 1015 and provides feedback to the user that the action was performed. The provided feedback may be visual or audible feedback via the HMD 1005 or haptic feedback via the I/O interface 1015.

In some embodiments, the engine 1050 generates color correction instructions to control operations of the at least one PBP color corrected structure of the optical assembly 1025. The engine 1050 generates the color corrected instructions in a plurality of time instants to control operations of switchable gratings in the PBP color corrected structure of the optical assembly 1025. In a different time instant, the engine 1050 provides a specific color correction instruction to the at least one PBP color corrected structure of the optical assembly 1025 to transmit light of a specific color channel. In this way, the engine 1050 instructs the at least one PBP color corrected structure of the optical assembly 1025 to operate as a time sequential color filter based on the color correction instructions. Other components of the at least one PBP color corrected structure in the optical assembly 1025 can be configured to diffract different color channels by a common angle and/or to focus different color channels to a common focus, thus providing image light corrected for chromatic aberration. In alternate embodiments, a controller of the HMD 1005 (not shown in FIG. 10) generates the color correction instructions and provides the color correction instructions to the at least one PBP color corrected structure of the optical assembly 1025.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical structure comprising:
   a plurality of stacked optical elements without an air gap between each pair of adjacent optical elements of the plurality of stacked optical elements, the plurality of stacked optical elements configured to:
   receive light of a specific color channel in a set of color channels having a first polarization, and
   output light of a second polarization different from the first polarization, the output light being focused to a focal point by one or more of the stacked optical elements that convert polarization of the received light from the first polarization to the second polarization, wherein the focal point depends on the first polarization and is common for the set of color channels.

2. The optical structure of claim 1, wherein:
   the plurality of stacked optical elements comprises a plurality of Pancharatnam Berry Phase (PBP) liquid crystal lenses; and
   each PBP liquid crystal lens is configured to adjust light of the specific color channel by a same amount based on focusing light of the specific color channel to the focal point common for the plurality of PBP liquid crystal lenses.

3. The optical structure of claim 2, wherein the specific color channel is different for each PBP liquid crystal lens.

4. The optical structure of claim 2, wherein each PBP liquid crystal lens has a unique liquid crystal rotation speed.

5. The optical structure of claim 1, further comprising:
   a controller configured to apply a voltage to an optical element of the plurality of stacked optical elements during a time period causing the optical element to output light of the second polarization during the time period.

6. The optical structure of claim 1, further comprising:
   a controller configured to apply, for each time instant of a plurality of time instants, a voltage to each optical element causing each optical element to output light of a different color channel of the set of color channels having the second polarization.

7. The optical structure of claim 1, wherein an optical element of the plurality of stacked optical elements adds an optical power to the received light of the specific color channel based at least in part on the first polarization.

8. The optical structure of claim 1, wherein an optical element of the plurality of stacked optical elements subtracts an optical power from the received light of the specific color channel based at least in part on the first polarization.

9. The optical structure of claim 1, wherein an optical element of the plurality of stacked optical elements changes an optical power associated with the received light of the specific color channel based on the first polarization and a voltage applied to the optical element.

10. The optical structure of claim 1, further comprising:
    a plurality of switchable gratings that are each configured to have an inactive mode to diffract light of one of the color channels not being propagated, and propagate light of other color channels in the set of color channels toward the stacked optical elements, the color channel being different for each switchable grating, and to have an active mode to propagate light that is inclusive of the set of color channels.

11. The optical structure of claim 10, wherein each switchable grating is configured in the inactive mode to transmit back light of the color channel.

12. The optical structure of claim 10, wherein:
    the plurality of switchable gratings comprises a plurality of electrically switchable Bragg gratings; and
    each electrically switchable Bragg grating is configured to diffract light of the color channel not being propagated and propagate light of the other color channels when a voltage level below a defined threshold is applied to each electrically switchable Bragg grating.

13. The optical structure of claim 10, wherein:
    the switchable gratings are stacked into a structure of the stacked switchable gratings; and
    the structure of the stacked switchable gratings is placed in front of the stacked optical elements.

14. The optical structure of claim 1, wherein the optical structure is part of a head-mounted display (HMD).

15. A method comprising:
    for each time instant of a plurality of time instants, providing light that is inclusive of a set of color channels to an optical structure comprising a plurality of stacked optical elements without an air gap between each pair of adjacent optical elements of the plurality of stacked optical elements, wherein
    the stacked optical elements receive light of a specific color channel in the set of color channels having a first polarization, and the stacked optical elements output light of a second polarization different from the first polarization, the output light being focused to a focal point by one or more of the stacked optical elements that convert polarization of the received light from the first polarization to the second polarization, wherein the focal point depends on the first polarization and is common for the set of color channels; and for each time instant, using a specific optical element of the plurality of stacked optical elements to focus light of the specific color channel to the common focal point.

16. The method of claim 15, wherein the plurality of stacked optical elements comprises a plurality of Pancharatnam Berry Phase (PBP) liquid crystal lenses, and the method further comprising:

using a different one of the PBP liquid crystal lenses to adjust light of the specific color channel by a same amount based on focusing light of the specific color channel to the focal point common for the plurality of PBP liquid crystal lenses.

17. The method of claim 16, wherein the specific color channel is different for each PBP liquid crystal lens.

18. The method of claim 15, further comprising:

for each time instant of the plurality of time instants, applying a voltage to each optical element causing each optical element to output light of a different color channel of the set of color channels having the second polarization.

19. A head-mounted display (HMD) comprising:

a display configured to emit image light that is inclusive of a set of color channels;

an optical structure configured to:

optically correct for chromatic aberration for the set of color channels using a plurality of stacked optical elements that outputs image light corrected for chromatic aberration for the set of color channels in accordance with color correction instructions, the stacked optical elements configured to:

receive light of a first polarization having a specific color channel of the set of color channels, and output light of a second polarization different from the first polarization, the output light being focused to a focal point by one or more of the stacked optical elements that convert polarization of the received light from the first polarization to the second polarization, wherein the focal point depends on the first polarization and is common for the set of color channels; and direct the optically corrected image light to an eye-box region of the HMD corresponding to a location of an eye of a user of the HMD; and a controller configured to:

generate the color correction instructions, and provide the color correction instructions to the optical structure.

20. The MID of claim 19, wherein:

the plurality of stacked optical elements comprises a plurality of PBP liquid crystal lenses;

each PBP liquid crystal lens is configured to adjust light of the specific color channel by a same amount based on focusing light of the specific color channel to the focal point common for the plurality of PBP liquid crystal lenses; and the focused light is directed to the eye-box region of the HMD as the optically corrected image light.

* * * * *